(12) United States Patent
Yang et al.

(10) Patent No.: US 10,942,336 B2
(45) Date of Patent: Mar. 9, 2021

(54) CAMERA LENS ASSEMBLY

(71) Applicant: Zhejiang Sunny Optical Co., Ltd, Ningbo (CN)

(72) Inventors: Jian Yang, Ningbo (CN); Jianke Wenren, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 393 days.

(21) Appl. No.: 15/772,879

(22) PCT Filed: Jul. 19, 2017

(86) PCT No.: PCT/CN2017/093507
§ 371 (c)(1),
(2) Date: May 2, 2018

(87) PCT Pub. No.: WO2018/192126
PCT Pub. Date: Oct. 25, 2018

(65) Prior Publication Data
US 2020/0257085 A1    Aug. 13, 2020

(30) Foreign Application Priority Data

Apr. 17, 2017  (CN) .......................... 201710251953.9
Apr. 17, 2017  (CN) .......................... 201720399526.0

(51) Int. Cl.
*G02B 13/04*    (2006.01)
*G02B 21/02*    (2006.01)
(Continued)

(52) U.S. Cl.
CPC .......... *G02B 13/0045* (2013.01); *G02B 9/64* (2013.01); *G02B 27/0025* (2013.01)

(58) Field of Classification Search
CPC ...... G02B 13/04; G02B 21/02; G02B 15/177; G02B 13/24; G02B 9/64; G02B 13/00; G02B 13/0045; G02B 1/041
(Continued)

(56) References Cited

U.S. PATENT DOCUMENTS

2014/0211324 A1* 7/2014 Ishizaka ............. G02B 27/0025
                                                        359/708
2016/0033743 A1  2/2016 Chen
(Continued)

FOREIGN PATENT DOCUMENTS

CN    106842512 A    6/2017

*Primary Examiner* — Dawayne Pinkney
(74) *Attorney, Agent, or Firm* — Sughrue Mion, PLLC

(57) ABSTRACT

The present disclosure describes a camera lens assembly having a total effective focal length f and an entrance pupil diameter EPD satisfying f/EPD≤1.9. The camera lens assembly includes, sequentially along an optical axis from an object side to an image side, the first to the seventh lenses. The first lens has a positive refractive power, and a convex object side surface; the second lens has a positive refractive power, and a convex object side surface and a convex image side surface; the third lens has a negative refractive power; the fourth lens and the fifth lens have a positive refractive power or negative refractive power; the sixth lens has a positive refractive power or negative refractive power, and a concave image side surface of the sixth lens is in a paraxial region; and the seventh lens has a negative refractive power, and a concave image side surface in the paraxial region.

19 Claims, 14 Drawing Sheets

(51) Int. Cl.
 *G02B 15/14* (2006.01)
 *G02B 9/64* (2006.01)
 *G02B 9/62* (2006.01)
 *G02B 13/00* (2006.01)
 *G02B 27/00* (2006.01)

(58) Field of Classification Search
 USPC ....... 359/751, 656, 657, 682, 754, 755, 750,
 359/757, 759
 See application file for complete search history.

(56) References Cited

U.S. PATENT DOCUMENTS

2016/0124191 A1 5/2016 Hashimoto
2017/0052350 A1 2/2017 Chen

* cited by examiner

CAMERA LENS ASSEMBLY

CROSS-REFERENCE TO RELATED APPLICATIONS

This application is a National Stage of International Application No. PCT/CN2017/093507 filed Jul. 19, 2017 which claims the priorities and rights of Chinese Patent Application No. 201710251953.9 filed with the State Intellectual Property Office of China (SIPO) on Apr. 17, 2017 and Chinese Patent Application No. 201720399526.0 filed with the SIPO on Apr. 17, 2017, the disclosures of which are incorporated herein by reference in their entireties.

TECHNICAL FIELD

The present disclosure relates to a camera lens assembly, and more specifically to a camera lens assembly comprising seven lenses.

BACKGROUND

In recent years, as the science and technology develop, portable electronic products are gradually emerging, and portable electronic products with camera functions are gaining more and more attention. Therefore, the market demand for camera lens assemblies suitable for portable electronic products is gradually increasing. As the portable electronic products tend to be miniaturized, the total length of the lens assembly is limited, thereby increasing the difficulty of the lens assembly design. At present, the commonly used photosensitive elements of camera lens assemblies are CCD (Charge-Coupled Device) or CMOS (Complementary Metal-Oxide Semiconductor). With the performance improvement and the size reduction of the CCD and COMS components, higher requirements on high imaging quality and miniaturization for the camera lens assembly matching with such elements have been put forward.

In order to satisfy the miniaturization requirement, a typically configured aperture number Fno (the effective focal length of the lens assembly/the entrance pupil diameter of the lens assembly) of the existing lens assemblies is 2.0 or above, which achieves a good optical performance while reducing the size of the lens assembly. However, with the constant development of portable electronic products such as smart phones, higher requirements are imposed to a camera lens assembly, particularly in the situations of insufficient lights (such as rainy days, dusk), hand trembling, and the like, so that an aperture number Fno of 2.0 or above has been unable to meet higher class imaging requirements.

Therefore, there is a need for a camera lens assembly with an ultra-thin, large aperture, an excellent imaging quality and low sensitivity that is suitable for portable electronic products.

SUMMARY

The technical solution provided by the present disclosure at least partially solves the technical problem described above.

According to one aspect of the present disclosure, a camera lens assembly is provided. The camera lens assembly has a total effective focal length f and an entrance pupil diameter EPD, and sequentially includes, along an optical axis from an object side to an image side, a first lens, a second lens, a third lens, a fourth lens, a fifth lens, a sixth lens, and a seventh lens. The first lens may have a positive refractive power, and an object side surface of the first lens is a convex surface; the second lens may have a positive refractive power, and an object side surface and an image side surface of the second lens are convex surfaces; the third lens may have a negative refractive power; the fourth lens and the fifth lens have a positive refractive power or a negative refractive power; the sixth lens has a positive refractive power or a negative refractive power, and an image side surface of the sixth lens is a concave surface in a paraxial region; and the seventh lens may have a negative refractive power, and an image side surface of the seventh lens is a concave surface in the paraxial region. The total effective focal length of the camera lens assembly f and the entrance pupil diameter of the camera lens assembly EPD may satisfy: $f/EPD \leq 1.9$.

In the present disclosure, a plurality of (for example, seven) lenses are adopted. By properly allocating the relationship between the effective focal length and the entrance pupil diameter of the camera lens assembly, the system has an advantage of a large aperture in the process of increasing an amount of light admitted, which increases the imaging effect in a dark environment; and reduces the aberration of the edge of the field of view.

According to another aspect of the present disclosure, a camera lens assembly is provided. The camera lens assembly sequentially includes, along an optical axis from an object side to an image side, a first lens, a second lens, a third lens, a fourth lens, a fifth lens, a sixth lens, and a seventh lens. The sixth lens has a positive refractive power or a negative refractive power, and an image side surface of the sixth lens is a concave surface in a paraxial region; and the seventh lens may have a negative refractive power, and an image side surface of the seventh lens is a concave surface in the paraxial region. An air spacing between the sixth lens and the seventh lens on the optical axis T67 and a center thickness of the seventh lens CT7 may satisfy: $0.2 < T67/CT7 < 1$.

In one embodiment, the first lens of the camera lens assembly may have a positive refractive power, and an object side surface of the first lens is a convex surface; the second lens may have a positive refractive power, and an object side surface and an image side surface of the second lens are convex surfaces; the third lens may have a negative refractive power; and the fourth lens and the fifth lens have a positive refractive power or a negative refractive power.

In one embodiment, the seventh lens may have at least one inflection point.

In one embodiment, a distance from the object side surface of the first lens to an image plane of the camera lens assembly on the optical axis TTL and half a diagonal length of an effective pixel area on the image plane of the camera lens assembly satisfy: $TTL/ImgH \leq 1.7$.

In one embodiment, an effective focal length of the first lens f1 and an effective focal length of the second lens f2 may satisfy: $0.5 < f1/f2 < 1.5$.

In one embodiment, the effective focal length of the second lens f2 and an effective focal length of the third lens f3 may satisfy: $-2 < f2/f3 < 0$.

In one embodiment, the total effective focal length of the camera lens assembly f and the effective focal length of the first lens f1 may satisfy: $f/f1 \leq 0.9$.

In one embodiment, a center thickness of the fifth lens CT5, a center thickness of the sixth lens CT6, and the center thickness of the seventh lens CT7 may satisfy: $0.1 < CT5/(CT6+CT7) < 0.8$.

In one embodiment, a center thickness of the first lens CT1 and a center thickness of the second lens CT2 may satisfy: $0.6 < CT1/CT2 < 1.5$.

In one embodiment, a maximum effective radius of the object side surface of the first lens DT11 and a maximum effective radius of an image side surface of the third lens DT33 may satisfy: $0.8 < DT11/DT33 < 1.5$.

In one embodiment, the total effective focal length of the camera lens assembly f and a radius of curvature of the image side surface of the seventh lens R14 may satisfy: $2.5 < f/R14 < 4.0$.

In one embodiment, the total effective focal length of the camera lens assembly f and the entrance pupil diameter of the camera lens assembly EPD may satisfy: $f/EPD \leq 1.9$.

The camera lens configured as above, has at least one of the beneficial effects such as miniaturization, high imaging quality, low sensitivity, better flat field curvature capability, better capability of reducing distortion, and the like.

BRIEF DESCRIPTION OF THE DRAWINGS

The above and other advantages of the embodiments of the present disclosure will become apparent by the detailed description with reference to the following accompanying drawings, and the accompanying drawings are intended to illustrate, rather than limit the exemplary embodiments of the present disclosure. In the accompanying drawings.

DETAILED DESCRIPTION OF EMBODIMENTS

Figure 1:
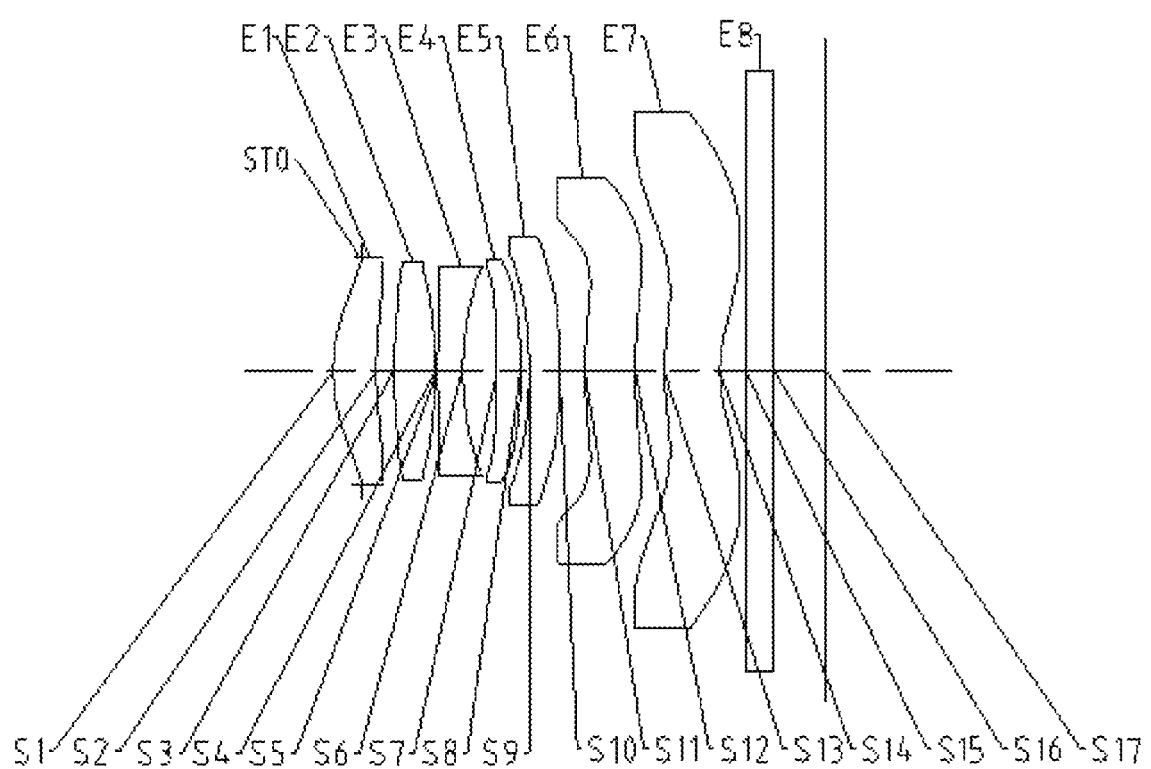
FIG. 1 is a schematic structural view illustrating a camera lens assembly according to Embodiment 1 of the present disclosure.

For better understanding the present disclosure, various aspects of the present disclosure will be described in more details with reference to the accompanying drawings. It should be understood that these detailed descriptions are merely illustrative of the exemplary embodiments of the present disclosure and do not in any way limit the scope of the present disclosure. Throughout the specification, the same reference numerals refer to the same elements. The expression "and/or" includes any and all combinations of one or more of the associated listed items.

It should be noted that, in this specification, the expressions, i.e., the first, the second and the like are only used to distinguish one feature from another feature without impose any limitation on the feature. Accordingly, the first lens discussed below may also be referred to as the second lens without departing from the teachings of the present disclosure.

In the accompanying drawings, the thickness, size and shape of the lens have been slightly exaggerated for the convenience of explanation. In particular, shapes of spherical surface or aspheric surfaces shown in the drawings are shown by illustrative means. That is, shapes of the spherical surfaces or the aspheric surfaces are not limited to the shapes of the spherical surfaces or the aspheric surfaces shown in the drawings. The drawings are only examples and not strictly drawn to scale.

It should also be understood that the terms "comprise," "have," "include" and variants thereof, when used in this specification, indicate the presence of the stated features, integrities, steps, operation, elements and/or components, but do not exclude the presence or addition of one or more other features, integrities, steps, operations, elements, components, and/or the combination thereof. In addition, when a representation such as "at least one of" appears after a list of features, the entire list of features is modified, rather than that an individual element in the list is modified. Besides, when describing the embodiments of the present disclosure, "may" means "one or more embodiments of the present disclosure." Meanwhile, the term "exemplary" is intended to refer to an example or to be illustrative by an example.

As used herein, the terms "substantially," "about" and the like are used to indicate an approximation rather than a degree, and are intended to be illustrative of the inherent deviations of measured or calculated values as recognized by those ordinary skilled in the art.

Unless otherwise defined, all terms (including technical and scientific terms) used herein have the same meaning as commonly understood by those ordinary skilled in the art to which the present disclosure belongs. It should also be understood that terms (such as those defined in commonly used dictionaries) should be interpreted as having a meaning that is consistent with their meanings in the context of the relevant art and will not be interpreted in an idealized or overly formal sense unless it is herein explicitly so defined.

It should be noted that, in the case of no conflict, the embodiments in the present disclosure and the features of the embodiments may be combined with each other. The present disclosure will be described in details below with reference to the accompanying drawings in combination with the embodiments.

The present disclosure is further described below with reference to the specific embodiments.

A camera lens assembly according to an exemplary embodiment of the present disclosure includes, for example, seven lenses, i.e., a first lens, a second lens, a third lens, a fourth lens, a fifth lens, a sixth lens, and a seventh lens. The seven lenses are sequentially arranged along an optical axis from an object side to an image side.

In an exemplary embodiment, the first lens may have a positive refractive power, and an object side surface of the first lens is a convex surface. The second lens may have a positive refractive power, an object side surface of the second lens is a convex surface, and an image side surface of the second lens is also a convex surface. The third lens may have a negative refractive power. The fourth lens has a positive refractive power or a negative refractive power. The fifth lens has a positive refractive power or a negative refractive power. The sixth lens has a positive refractive power or a negative refractive power, and an image side surface of the sixth lens is a concave surface in a paraxial region. The seventh lens may have a negative refractive power, and an image side surface of the seventh lens is a concave surface in the paraxial region. In addition, the seventh lens may have at least one inflection point, that is, the lens has a variation tendency from the center to the edge, for example, to become convex from concave, or to become convex from concave and then become concave.

The total effective focal length of the camera lens assembly f and the entrance pupil diameter of the camera lens assembly EPD according to the exemplary embodiments of the present disclosure may satisfy: f/EPD≤1.9. More specifically, the total effective focal length f and the entrance pupil diameter EPD may further satisfy: 1.79≤f/EPD≤1.90.

The camera lens assembly is configured to satisfy f/EPD≤1.9, which can enable the system to have an advantage of a large aperture in the process of increasing the amount of light admitted, thereby enhancing the imaging effect in a dark environment while reducing the aberration of the edge field-of-view.

The distance from the object side surface of the first lens to the image plane of the camera lens assembly on the optical axis TTL and the half a diagonal length of an effective pixel area on the image plane of the camera lens assembly ImgH may satisfy: TTL/ImgH≤1.7, for example, 1.49≤TTL/ImgH≤1.65. This may effectively compress the overall size of the camera lens assembly to achieve the ultra-thin characteristic and the miniaturization of the camera lens assembly.

In order to effectively balance the chromatic aberration and the field curvature, and reduce the light deflection angle and the sensitivity of the optical system, the effective focal length of each lens may be properly configured. For example, the effective focal length of the first lens f1 and the effective focal length of the second lens f2 may satisfy: 0.5<f1/f2<1.5. More specifically, f1 and f2 may further satisfy: 0.86≤f1/f2≤1.32. By properly configuring the refractive power of the first lens and the second lens, the deflection angle of light may be reduced, thereby reducing the sensitivity of the system. For another example, the effective focal length of the second lens f2 and the effective focal length of the third lens f3 may satisfy: −2<f2/f3<0. More specifically, f2 and f3 may further satisfy: −0.99≤f2/f3≤−0.86. As known to those skilled in the art, the spherical aberration is one of the most important factors that limit the resolution of the lens. In the present disclosure, by introducing a negative lens having a proper refractive power, the spherical aberration may be effectively balanced so as to effectively improve the imaging quality of the camera lens assembly. For another example, the total effective focal length of the camera lens assembly f and the effective focal length of the first lens f1 may satisfy: f/f1≤0.9. More specifically, f and f1 may further satisfy: 0.66≤f/f1≤0.85. By properly configuring the total effective focal length of the camera lens assembly f, the optical system may have a better capability of balancing the field curvature.

In applications, the center thickness of each lens may be optimized. The center thickness of the first lens CT1 and the center thickness of the second lens CT2 may satisfy: 0.6<CT1/CT2<1.5. More specifically, CT1 and CT2 may further satisfy: 0.99≤CT1/CT2≤1.09. By properly configuring the center thickness of the first lens CT1 and the center thickness of the second lens CT2, the camera lens assembly may have a better capability of balancing the aberration while being ensured to be miniaturized. The center thickness of the fifth lens CT5, the center thickness of the sixth lens CT6 and the center thickness of the seventh lens CT7 may satisfy: 0.1<CT5/(CT6+CT7)<0.8, more specifically, 0.26≤CT5/(CT6+CT7)≤0.51. By properly configuring the center thickness of each lens, the camera lens assembly has a better capability of eliminating the distortion to improve the imaging quality, while the miniaturization is ensured.

In addition, the axial spacing among the lenses may be optimized. For example, the air spacing between the sixth lens and the seventh lens on the optical axis T67 and the center thickness of the seventh lens CT7 may satisfy: 0.2<T67/CT7<1. For example, T67 and CT7 may further satisfy: 0.29≤T67/CT7≤0.52. By properly configuring the air spacing between the sixth lens and the seventh lens on the optical axis, the size of the camera lens assembly may be effectively compressed, so as to ensure the ultra-thin characteristic of the camera lens assembly.

The maximum effective radius of the object side surface of the first lens DT11 and the maximum effective radius of the image side surface of the third lens DT33 may satisfy: 0.8<DT11/DT33<1.5, and more specifically, DT11 and DT33 may further satisfy: 1.09≤DT11/DT33≤1.23. By limiting the apertures of the first lens and the third lens, the optical system may have a suitable smaller aperture at the front end, thereby effectively reducing the front opening of the module.

In order to ensure that the camera lens assembly can easily match with an often used chip, the radius of curvature of the image side surface of the seventh lens needs to be properly configured. For example, the total effective focal length of the camera lens assembly f and the radius of curvature of the image side surface of the seventh lens R14 may satisfy: 2.5<f/R14<4.0, and more specifically, f and R14 may further satisfy: 2.91≤f/R14≤3.13.

The camera lens assembly according to the above-described embodiments of the present disclosure may be in a plural number, for example, seven as described above. Properly allocating the refractive power, the surface type and the center thickness of each lens, and the axial spacing among lenses, may effectively enlarge the aperture of the camera lens assembly, reduce the sensitivity of the system, ensure the miniaturization of the lens assembly and improve the imaging quality, so that the camera lens assembly becomes more conducive to the production and processing and may be applicable for portable electronic products. In the embodiments of the present disclosure, at least one of the mirror surfaces of the lenses is an aspheric mirror surface. The aspheric lens is characterized in that the curvature continuously changes from the center of the lens to the periphery thereof. Being different from the spherical lens having a constant curvature from the center of the lens to the periphery, the aspheric lens has a better radius of curvature characteristic and an advantage of improving distorted aberrations and improving astigmatic aberrations, capable of making the field-of-view larger and more realistic. Adopting the aspheric lens can eliminate aberrations occurred at the time of imaging as much as possible, so as to improve the imaging quality. In addition, the use of the aspheric lens may also effectively reduce the number of lenses in the optical system.

However, those skilled in the art should understand that the number of lenses constituting the lens assembly can be changed without departing from the technical solution claimed in the present disclosure to obtain the various results and advantages as described in this specification. For example, although seven lenses are described as an example in the embodiments, the camera lens assembly is not limited to including seven lenses. The camera lens assembly may further include other numbers of lenses if necessary.

Specific embodiments of the optical lens assembly applicable to the above embodiments are further described below with reference to the accompanying drawings.

Embodiment 1

The camera lens assembly according to Embodiment 1 of the present disclosure is described below with reference to FIGS. 1 to 2D. FIG. 1 illustrates a schematic structural view of a camera lens assembly according to Embodiment 1 of the present disclosure.

As shown in FIG. 1, the camera lens assembly includes seven lenses E1-E7 sequentially arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. Light from an object sequentially passes through the respective surfaces S1 to S16 and finally forms an image on the image plane S17.

In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings.

Table 1 shows the surface type, the radius of curvature, the thickness, the material, and the conic coefficient of each lens of the camera lens assembly of Embodiment 1, wherein the unit of both the radius of curvature and the thickness is millimeter (mm).

TABLE 1

| Surface No. | Surface Type | Radius of Curvature | Thickness | Material Refractive Index | Abbe Number | Conic Coefficient |
|---|---|---|---|---|---|---|
| OBJ | spherical | infinite | infinite | | | |
| STO | spherical | infinite | −0.2950 | | | |
| S1 | aspheric | 1.8275 | 0.4502 | 1.54 | 56.1 | −12.3169 |
| S2 | aspheric | 3.5328 | 0.1855 | | | −20.2402 |
| S3 | aspheric | 4.2279 | 0.4309 | 1.54 | 56.1 | −16.8635 |
| S4 | aspheric | −6.9708 | 0.0300 | | | −18.1535 |
| S5 | aspheric | 10.8664 | 0.2580 | 1.66 | 20.4 | 70.4206 |
| S6 | aspheric | 2.7719 | 0.3626 | | | −24.0313 |
| S7 | aspheric | −24.6688 | 0.2500 | 1.64 | 23.5 | −99.0000 |
| S8 | aspheric | −6.2128 | 0.0904 | | | −99.0000 |
| S9 | aspheric | −5.0274 | 0.3163 | 1.64 | 23.5 | −99.0000 |
| S10 | aspheric | −9.0025 | 0.2645 | | | −775.0295 |
| S11 | aspheric | 4.9575 | 0.5252 | 1.64 | 23.5 | −124.7966 |
| S12 | aspheric | 6.0503 | 0.3045 | | | −37.8396 |
| S13 | aspheric | 2.1645 | 0.5820 | 1.54 | 56.1 | −2.6570 |

TABLE 1-continued

| Surface No. | Surface Type | Radius of Curvature | Thickness | Material Refractive Index | Abbe Number | Conic Coefficient |
|---|---|---|---|---|---|---|
| S14 | aspheric | 1.3857 | 0.2700 | | | −4.1622 |
| S15 | spherical | infinite | 0.3000 | 1.52 | 64.2 | |
| S16 | spherical | infinite | 0.5491 | | | |
| S17 | spherical | infinite | 0 | | | |

It can be seen from table 1 that the center thickness CT1 of the first lens E1 and the center thickness CT2 of the second lens E2 satisfy: CT1/CT2=1.04. The center thickness CT5 of the fifth lens E5, the center thickness CT6 of the sixth lens E6, and the center thickness CT7 of the seventh lens E7 satisfy: CT5/(CT6+CT7)=0.29. The air spacing T67 between the sixth lens E6 and the seventh lens E7 on the optical axis and the center thickness CT7 of the seventh lens E7 satisfy: T67/CT7=0.52.

In this embodiment, seven lenses are adopted as an example. Through properly distributing the focal lengths and the surface types of the lenses, the aperture of the lens assembly is effectively enlarged, the total length of the lens assembly is shortened, and a large aperture and the miniaturization of the lens assembly is ensured; meanwhile, various types of aberrations are corrected, and the resolution and the imaging quality of the lens assembly are improved. The surface type x of various aspheric surfaces is defined by the following formula:

$$x = \frac{ch^2}{1 + \sqrt{1-(k+1)c^2h^2}} + \sum A_i h^i \quad (1)$$

Here, x is a distance sagittal height from the apex of the aspheric surface when the aspheric surface is at a height of h along the optical axis; c is the paraxial curvature of the aspheric surface, and c=1/R (i.e., the paraxial curvature c is the reciprocal of the radius of curvature R in table 1 above); k is the conic coefficient (given in table 1 above); and Ai is the correction factor for the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ that can be applicable to each of the mirror surfaces S1-S14 in Embodiment 1.

TABLE 2

| Surface No. | A4 | A6 | A8 | A10 | A12 |
|---|---|---|---|---|---|
| S1 | 2.2261E−01 | −3.2755E−01 | 4.0141E−01 | −3.8468E−01 | 1.9609E−01 |
| S2 | 2.6218E−04 | −1.1789E−01 | 2.4437E−01 | −5.7925E−01 | 9.8217E−01 |
| S3 | −3.8707E−02 | −1.6498E−02 | −7.9640E−02 | 2.4714E−01 | −2.1793E−01 |
| S4 | −5.8394E−02 | 1.5273E−01 | −6.0227E−01 | 1.3320E+00 | −1.7391E+00 |
| S5 | −8.6880E−02 | 2.7270E−01 | −9.6314E−01 | 2.2204E+00 | −3.3611E+00 |
| S6 | 8.0721E−02 | −9.8422E−02 | 1.6726E−01 | −2.7870E−01 | 3.0103E−01 |
| S7 | −5.2828E−02 | 9.8315E−03 | −1.4900E−01 | 7.5039E−01 | −1.8674E+00 |
| S8 | −8.5319E−02 | −3.9493E−03 | −2.1294E−03 | 2.3324E−01 | −6.4357E−01 |
| S9 | −8.5109E−02 | 2.0862E−03 | 8.5099E−04 | 2.3401E−01 | −6.4375E−01 |
| S10 | −8.8702E−02 | 3.0144E−02 | −1.4192E−01 | 3.5765E−01 | −4.4402E−01 |
| S11 | 1.8519E−01 | −4.6717E−01 | 6.4843E−01 | −7.3105E−01 | 5.9194E−01 |
| S12 | 4.1308E−02 | −3.4013E−02 | −3.2519E−02 | 4.5445E−02 | −2.5459E−02 |
| S13 | −2.5245E−01 | 1.3735E−01 | −5.9682E−02 | 1.9844E−02 | −4.2708E−03 |
| S14 | −1.3255E−01 | 7.1056E−02 | −3.1808E−02 | 1.0282E−02 | −2.3232E−03 |

| Surface No. | A14 | A16 | A18 | A20 |
|---|---|---|---|---|
| S1 | 4.9960E−03 | −8.0708E−02 | 4.9884E−02 | −1.0373E−02 |
| S2 | −1.0389E+00 | 6.6604E−01 | −2.3552E−01 | 3.5120E−02 |
| S3 | 6.5652E−02 | 3.1068E−02 | −3.2045E−02 | 8.0160E−03 |
| S4 | 1.3512E+00 | −5.9720E−01 | 1.3090E−01 | −8.9617E−03 |
| S5 | 3.2253E+00 | −1.8653E+00 | 5.9560E−01 | −8.1332E−02 |
| S6 | −1.3247E−01 | −5.1995E−02 | 8.9831E−02 | −2.9444E−02 |
| S7 | 2.6281E+00 | −2.1633E+00 | 9.7547E−01 | −1.8574E−01 |
| S8 | 8.1359E−01 | −5.5072E−01 | 1.9603E−01 | −2.9830E−02 |
| S9 | 8.1360E−01 | −5.5072E−01 | 1.9603E−01 | −2.9830E−02 |
| S10 | 3.1184E−01 | −1.2225E−01 | 2.4345E−02 | −1.8652E−03 |
| S11 | −3.2166E−01 | 1.0927E−01 | −2.0658E−02 | 1.6458E−03 |
| S12 | 8.0478E−03 | −1.4705E−03 | 1.4366E−04 | −5.7703E−06 |
| S13 | 5.2950E−04 | −3.0892E−05 | 1.3552E−07 | 4.4158E−08 |
| S14 | 3.6407E−04 | −3.8023E−05 | 2.3686E−06 | −6.5792E−08 |

Table 3 below shows, according to Embodiment 1, the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17.

TABLE 3

| | Parameter | | | | | | | | |
|---|---|---|---|---|---|---|---|---|---|
| f1 (mm) | f2 (mm) | f3 (mm) | f4 (mm) | f5 (mm) | f6 (mm) | f7 (mm) | f (mm) | TTL (mm) | ImgH (mm) |
| Value 6.34 | 4.89 | −5.65 | 12.82 | −18.23 | 35.83 | −9.58 | 4.20 | 5.17 | 3.46 |

According to table 3, the total effective focal length f of the camera lens assembly and the entrance pupil diameter EPD of the camera lens assembly satisfy: f/EPD=1.79. The distance TTL from the object side surface S1 of the first lens E1 to the image plane S17 of the camera lens assembly on the optical axis and the half a diagonal length ImgH of an effective pixel area on the image plane S17 of the camera lens assembly satisfy: TTL/ImgH=1.49. The effective focal length f1 of the first lens E1 and the effective focal length f2 of the second lens E2 satisfy: f1/f2=1.30. The effective focal length f2 of the second lens E2 and the effective focal length f3 of the third lens E3 satisfy: f2/f3=−0.86. The effective focal length f1 of the first lens E1 and the total effective focal length f of the camera lens assembly satisfy: f/f1=0.66. As can be seen by referencing to table 1 and table 3, the total effective focal length f of the camera lens assembly and the radius of curvature R14 of the image side surface S14 of the seventh lens E7 satisfy: f/R14=3.03.

In this embodiment, the maximum effective radius DT11 of the object side surface S1 of the first lens E1 and the maximum effective radius DT33 of the image side surface S6 of the third lens E3 satisfy: DT11/DT33=1.09.

Figure 2A:
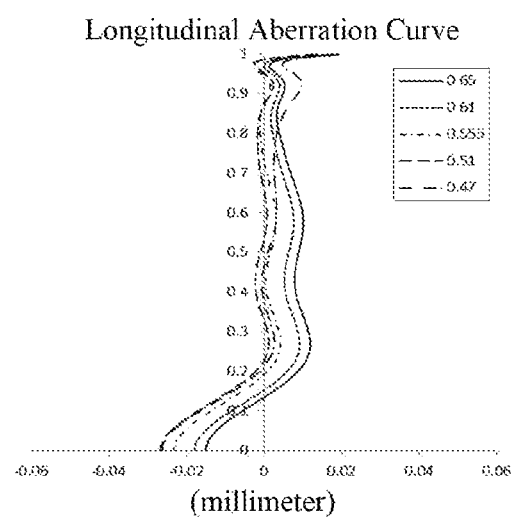
FIG. 2A illustrates a longitudinal aberration curve of the camera lens assembly of Embodiment 1.
Figure 2B:
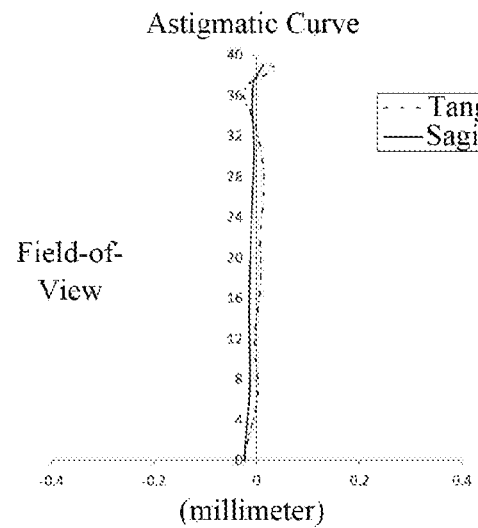
FIG. 2B illustrates an astigmatic curve of the camera lens assembly of Embodiment 1.
Figure 2C:
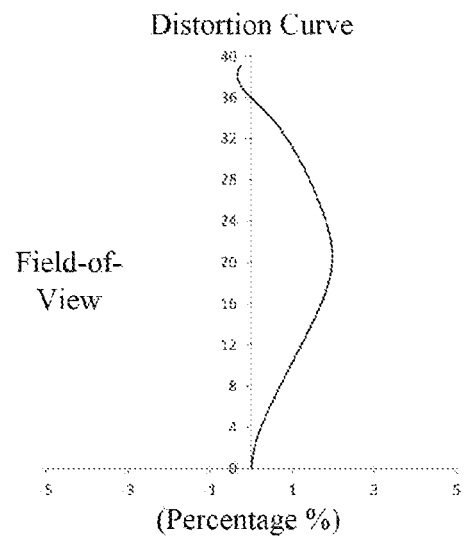
FIG. 2C illustrates a distortion curve of the camera lens assembly of Embodiment 1.
Figure 2D:
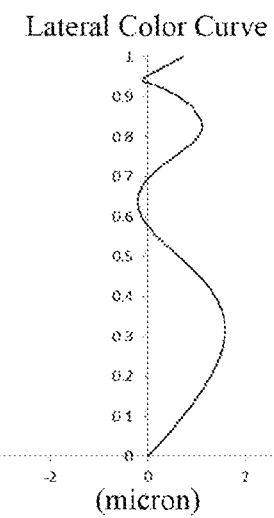
FIG. 2D illustrates a lateral color curve of the camera lens assembly of Embodiment 1.

FIG. 2A illustrates a longitudinal aberration curve of the camera lens assembly of Embodiment 1, which indicates deviations of focal points of light of different wavelengths converged after passing through the optical system. FIG. 2B illustrates an astigmatic curve of the camera lens assembly of Embodiment 1, which shows a tangential image surface curvature and a sagittal image surface curvature. FIG. 2C illustrates a distortion curve of the camera lens assembly of Embodiment 1, which represents the distortion values in the case of different viewing angles. FIG. 2D illustrates a lateral color curve of the camera lens assembly of Embodiment 1, which represents the deviation of different image heights on the image plane after light passing through the camera lens assembly. It can be seen from FIGS. 2A to 2D that the camera lens assembly given in Embodiment 1 can achieve a good imaging quality.

Embodiment 2

Figure 3:
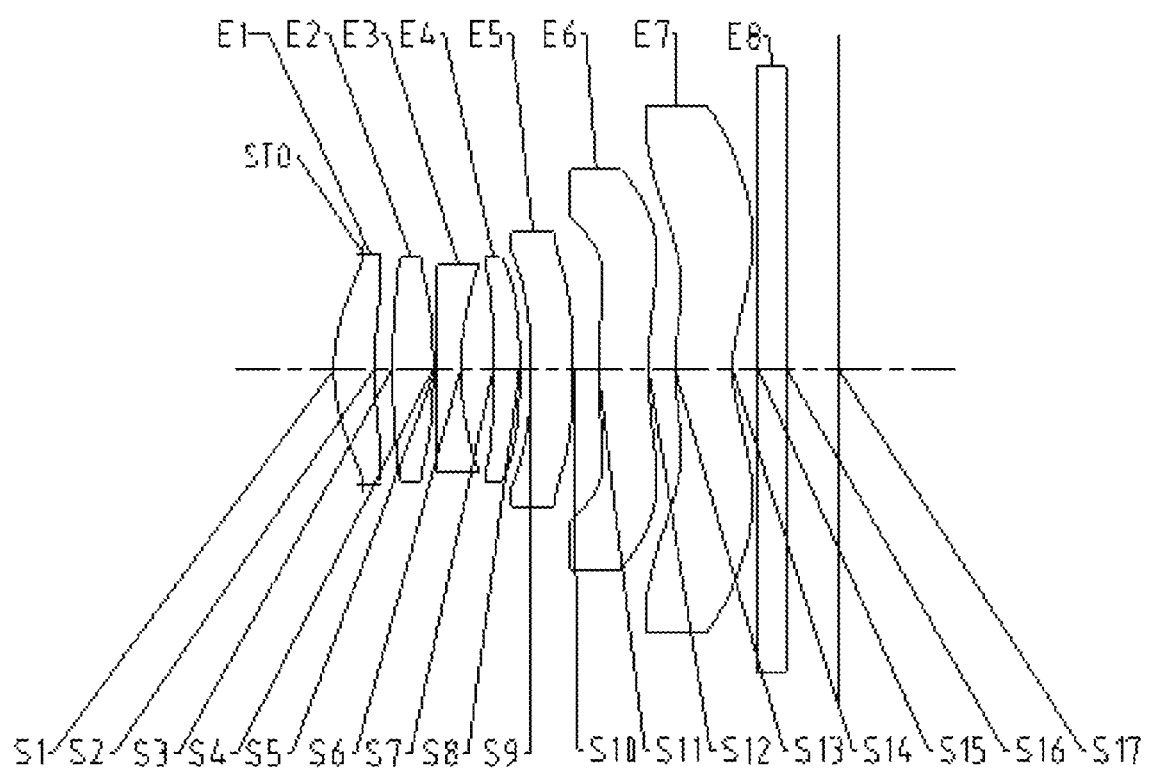
FIG. 3 is a schematic structural view illustrating a camera lens assembly according to Embodiment 2 of the present disclosure.

The camera lens assembly according to Embodiment 2 of the present disclosure is described below with reference to FIGS. 3 to 4D. In the present embodiment and the following embodiments, the descriptions similar to those of the Embodiment 1 will be omitted for the purpose of brevity. FIG. 3 illustrates a schematic structural view of a camera lens assembly according to Embodiment 2 of the present disclosure.

As shown in FIG. 3, the camera lens assembly includes seven lenses E1-E7 sequentially arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 4 shows the surface type, the radius of curvature, the thickness, the material, and the conic coefficient of each lens of the camera lens assembly of Embodiment 2, wherein the unit of both the radius of curvature and the thickness is millimeter (mm). Table 5 shows the high-order coefficients of each aspheric mirror surface in Embodiment 2. Table 6 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 2. The surface type of each aspheric surface may be defined by formula (1) given in the above-mentioned Embodiment 1.

TABLE 4

| Surface No. | Surface Type | Radius of Curvature | Thickness | Material Refractive Index | Material Abbe Number | Conic Coefficient |
|---|---|---|---|---|---|---|
| OBJ | spherical | infinite | infinite | | | |
| STO | spherical | infinite | −0.3038 | | | |
| S1 | aspheric | 1.8373 | 0.4302 | 1.54 | 56.1 | −12.1155 |
| S2 | aspheric | 4.7334 | 0.1946 | | | −21.6064 |
| S3 | aspheric | 5.9592 | 0.3931 | 1.54 | 56.1 | −20.3308 |
| S4 | aspheric | −7.2524 | 0.0300 | | | −21.6249 |
| S5 | aspheric | 10.1764 | 0.3000 | 1.66 | 20.4 | 70.2899 |
| S6 | aspheric | 2.8815 | 0.3183 | | | −25.2977 |
| S7 | aspheric | −551.3502 | 0.2723 | 1.64 | 23.5 | −99.0000 |
| S8 | aspheric | 30.2473 | 0.0667 | | | −99.0000 |
| S9 | aspheric | 2663.1609 | 0.6166 | 1.64 | 23.5 | −99.0000 |
| S10 | aspheric | −25.1474 | 0.2737 | | | −277.1122 |
| S11 | aspheric | 5.9495 | 0.5618 | 1.64 | 23.5 | −151.1177 |
| S12 | aspheric | 5.8244 | 0.1882 | | | −36.6062 |
| S13 | aspheric | 2.3836 | 0.6441 | 1.54 | 56.1 | −2.3488 |
| S14 | aspheric | 1.5234 | 0.2599 | | | −4.5906 |
| S15 | spherical | infinite | 0.3000 | 1.52 | 64.2 | |
| S16 | spherical | infinite | 0.5370 | | | |
| S17 | spherical | infinite | 0 | | | |

TABLE 5

| Surface No. | A4 | A6 | A8 | A10 | A12 |
|---|---|---|---|---|---|
| S1 | 2.2038E−01 | −3.1805E−01 | 3.7621E−01 | −3.0340E−01 | 1.9472E−02 |
| S2 | −9.8786E−03 | −6.3294E−02 | 1.0489E−02 | 9.8522E−02 | −2.4856E−01 |
| S3 | −4.1962E−02 | −3.0517E−02 | 5.4386E−03 | 4.4804E−02 | 5.0343E−02 |
| S4 | −5.3223E−02 | 1.0953E−01 | −3.3064E−01 | 4.6935E−01 | −1.6150E−01 |
| S5 | −8.4400E−02 | 2.3086E−01 | −6.7855E−01 | 1.2852E+00 | −1.6206E+00 |
| S6 | 8.1074E−02 | −8.7457E−02 | 2.2270E−02 | 3.6184E−01 | −1.2835E+00 |
| S7 | −7.0234E−02 | 6.8646E−02 | −3.1144E−01 | 1.1388E+00 | −2.5993E+00 |
| S8 | −8.2703E−02 | −6.1543E−03 | −3.6099E−03 | 2.3308E−01 | −6.4321E−01 |
| S9 | −8.8292E−02 | 2.3895E−03 | 1.3723E−03 | 2.3408E−01 | −6.4382E−01 |
| S10 | −7.3922E−02 | 1.8876E−02 | −9.2756E−02 | 2.3525E−01 | −2.7587E−01 |
| S11 | 1.8245E−01 | −4.6463E−01 | 6.4860E−01 | −7.3106E−01 | 5.9193E−01 |
| S12 | 4.8890E−02 | −5.2792E−02 | −5.5687E−02 | 2.4017E−02 | −1.4833E−02 |
| S13 | −2.5868E−01 | 1.5267E−01 | −7.3534E−02 | 2.7463E−02 | −7.0414E−03 |
| S14 | −1.2228E−01 | 6.3629E−02 | −2.7404E−02 | 8.4233E−03 | −1.7770E−03 |

| Surface No. | A14 | A16 | A18 | A20 |
|---|---|---|---|---|
| S1 | 2.2783E−01 | −2.4156E−01 | 1.1120E−01 | −1.9810E−02 |
| S2 | 3.4568E−01 | −2.7293E−01 | 1.1480E−01 | −1.9710E−02 |
| S3 | −1.3334E−01 | 9.9013E−02 | −3.3937E−02 | 5.3205E−03 |
| S4 | −4.0426E−01 | 5.7571E−01 | −3.0270E−01 | 5.9757E−02 |
| S5 | 1.2814E+00 | −5.7881E−01 | 1.3345E−01 | −1.2404E−02 |
| S6 | 2.2253E+00 | −2.1398E+00 | 1.1033E+00 | −2.3675E−01 |
| S7 | 3.5698E+00 | −2.9168E+00 | 1.3099E+00 | −2.4787E−01 |
| S8 | 8.1359E−01 | −5.5072E−01 | 1.9603E−01 | −2.9830E−02 |
| S9 | 8.1360E−01 | −5.5072E−01 | 1.9603E−01 | −2.9830E−02 |
| S10 | 1.7827E−01 | −6.2121E−02 | 1.0266E−02 | −5.4275E−04 |
| S11 | −3.2167E−01 | 1.0927E−01 | −2.0658E−02 | 1.6457E−03 |
| S12 | 4.7007E−03 | −8.2404E−04 | 7.4174E−05 | −2.5891E−06 |
| S13 | 1.1815E−03 | −1.2548E−04 | 7.8099E−06 | −2.2284E−07 |
| S14 | 2.5854E−04 | −2.5458E−05 | 1.5384E−06 | −4.2624E−08 |

TABLE 6

| Parameter | | | | | | | | | |
|---|---|---|---|---|---|---|---|---|---|
| f1 (mm) | f2 (mm) | f3 (mm) | f4 (mm) | f5 (mm) | f6 (mm) | f7 (mm) | f (mm) | TTL (mm) | ImgH (mm) |
| Value 6.11 | 5.09 | −5.58 | 15.48 | −68.12 | −54.08 | −10.99 | 4.32 | 5.29 | 3.26 |

Figure 4A:
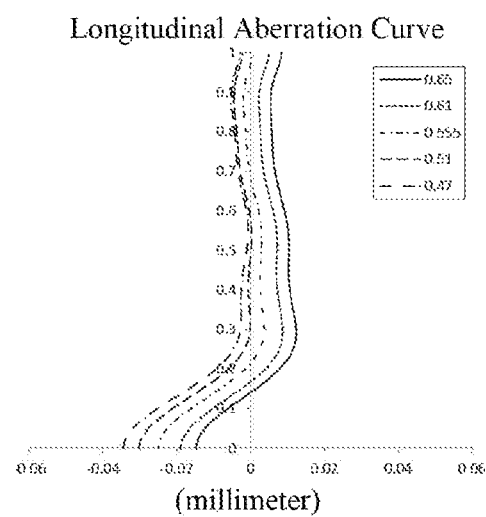
FIG. 4A illustrates a longitudinal aberration curve of the camera lens assembly of Embodiment 2.
Figure 4B:
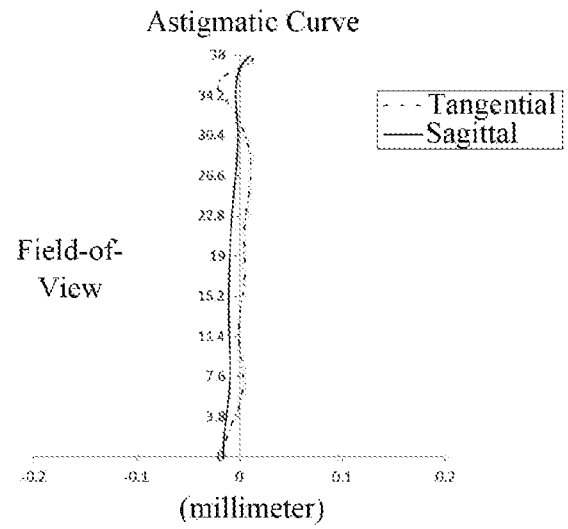
FIG. 4B illustrates an astigmatic curve of the camera lens assembly of Embodiment 2.
Figure 4C:
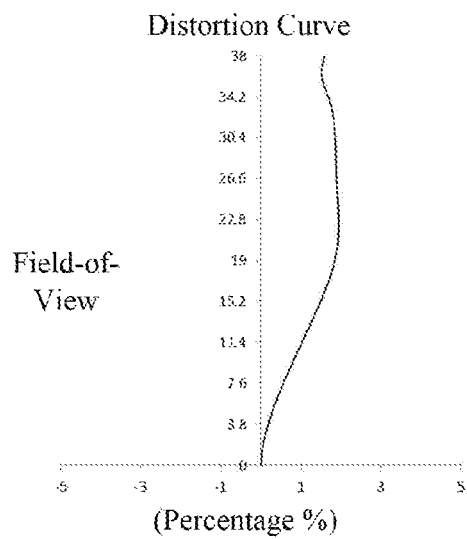
FIG. 4C illustrates a distortion curve of the camera lens assembly of Embodiment 2.
Figure 4D:
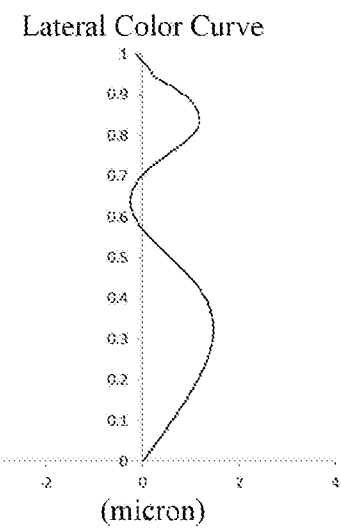
FIG. 4D illustrates a lateral color curve of the camera lens assembly of Embodiment 2.

FIG. 4A illustrates a longitudinal aberration curve of the camera lens assembly of Embodiment 2, which represents deviations of focal points of light of different wavelengths converged after passing through the optical system. FIG. 4B illustrates an astigmatic curve of the camera lens assembly of Embodiment 2, which shows a tangential image surface curvature and a sagittal image surface curvature. FIG. 4C illustrates a distortion curve of the camera lens assembly of Embodiment 2, which represents the distortion values in the case of different viewing angles. FIG. 4D illustrates a lateral color curve of the camera lens assembly of Embodiment 2, which represents the deviation of different image heights on the image plane after light passing through the camera lens assembly. It can be seen from FIGS. 4A to 4D that the camera lens assembly given in Embodiment 2 can achieve a good imaging quality.

Embodiment 3

Figure 5:
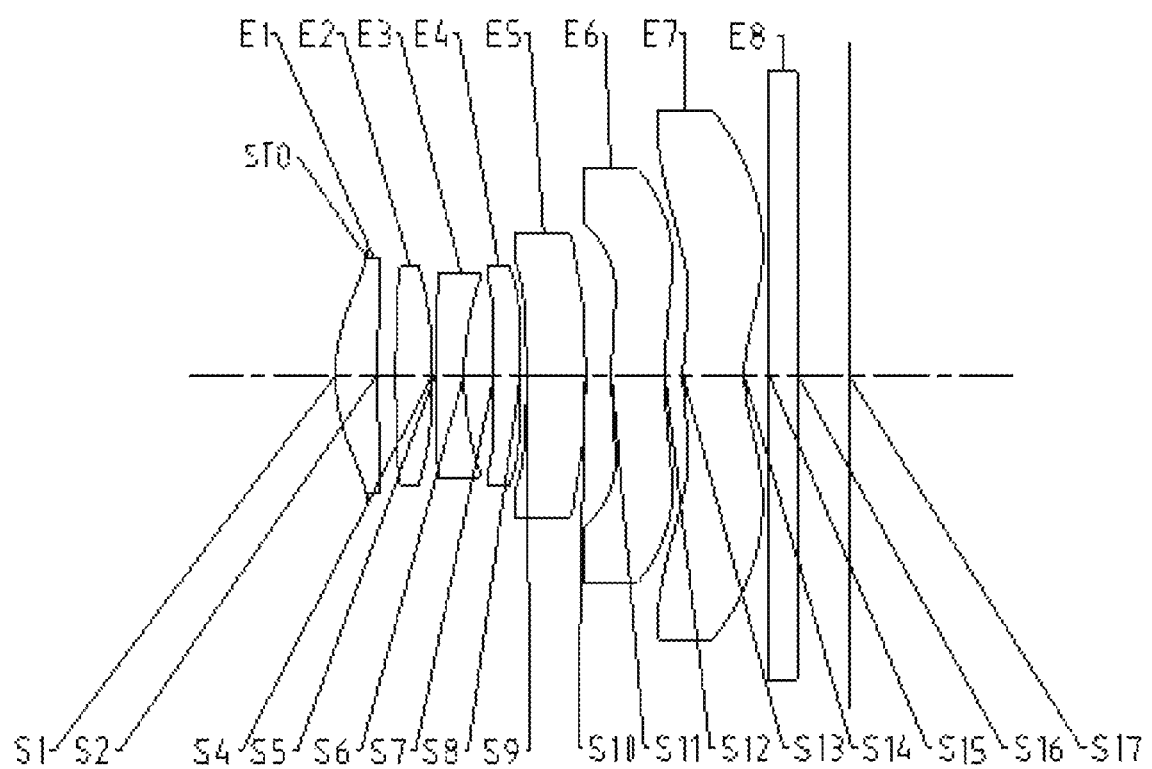
FIG. 5 is a schematic structural view illustrating a camera lens assembly according to Embodiment 3 of the present disclosure.

The camera lens assembly according to Embodiment 3 of the present disclosure is described below with reference to FIGS. 5 to 6D. FIG. 5 illustrates a schematic structural view of a camera lens assembly according to Embodiment 3 of the present disclosure.

As shown in FIG. 5, the camera lens assembly includes seven lenses E1-E7 sequentially arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 7 shows the surface type, the radius of curvature, the thickness, the material, and the conic coefficient of each lens of the camera lens assembly of Embodiment 3, wherein the unit of both the radius of curvature and the thickness is millimeter (mm). Table 8 shows the high-order coefficients of each aspheric mirror surface in Embodiment 3. Table 9 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 3. The surface type of each aspheric surface may be defined by formula (1) given in the above-mentioned Embodiment 1.

TABLE 7

| Surface No. | Surface Type | Radius of Curvature | Thickness | Material Refractive Index | Abbe Number | Conic Coefficient |
|---|---|---|---|---|---|---|
| OBJ | spherical | infinite | infinite | | | |
| STO | spherical | infinite | −0.2927 | | | |
| S1 | aspheric | 1.8373 | 0.4332 | 1.54 | 56.1 | −11.3650 |
| S2 | aspheric | 4.7334 | 0.1846 | | | −21.3157 |
| S3 | aspheric | 5.9592 | 0.4178 | 1.54 | 56.1 | −24.5555 |
| S4 | aspheric | −7.2524 | 0.03 | | | −16.4703 |
| S5 | aspheric | 10.1764 | 0.258 | 1.66 | 20.4 | 72.5496 |
| S6 | aspheric | 2.8815 | 0.3167 | | | −22.9523 |
| S7 | aspheric | −551.3502 | 0.25 | 1.64 | 23.5 | 99.0000 |
| S8 | aspheric | 30.2473 | 0.0756 | | | −99.0000 |
| S9 | aspheric | 2663.1609 | 0.4876 | 1.64 | 23.5 | −99.0000 |
| S10 | aspheric | −25.1474 | 0.302 | | | −4967.1935 |
| S11 | aspheric | 5.9495 | 0.5633 | 1.64 | 23.5 | −209.7609 |
| S12 | aspheric | 5.8244 | 0.1822 | | | −56.1363 |
| S13 | aspheric | 2.3836 | 0.5849 | 1.54 | 56.1 | −1.71 |
| S14 | aspheric | 1.5234 | 0.2685 | | | −5.2430 |
| S15 | spherical | infinite | 0.3 | 1.52 | 64.2 | |
| S16 | spherical | infinite | 0.5456 | | | |
| S17 | spherical | infinite | 0 | | | |

TABLE 8

| Surface No. | A4 | A6 | A8 | A10 | A12 |
|---|---|---|---|---|---|
| S1 | 2.0885E−01 | −2.8830E−01 | 3.5744E−01 | −3.3502E−01 | 1.0938E−01 |
| S2 | −2.7108E−02 | −2.2129E−02 | −2.5046E−02 | 1.1922E−01 | −2.4027E−01 |
| S3 | −5.3018E−02 | −1.8954E−02 | 6.0928E−02 | −1.2953E−01 | 3.3157E−01 |
| S4 | −1.9483E−02 | −1.3977E−01 | 4.9093E−01 | −1.1692E+00 | 1.9542E+00 |
| S5 | −1.9678E−02 | −8.3889E−02 | 2.5202E−01 | −5.3235E−01 | 7.6831E−01 |
| S6 | 8.9939E−02 | −1.1175E−01 | 3.2894E−02 | 4.6306E−01 | −1.5872E+00 |
| S7 | −4.6787E−02 | 2.1229E−02 | −2.8001E−01 | 1.1958E+00 | −2.9046E+00 |

TABLE 8-continued

| | | | | | |
|---|---|---|---|---|---|
| S8 | −8.6390E−02 | −9.5825E−03 | −6.7215E−03 | 2.3389E−01 | −6.4145E−01 |
| S9 | −8.1072E−02 | −3.5661E−04 | 2.2159E−03 | 2.3353E−01 | −6.4445E−01 |
| S10 | −6.3143E−02 | −2.3709E−02 | 2.9724E−02 | 5.4258E−02 | −1.1097E−01 |
| S11 | 1.6722E−01 | −4.5552E−01 | 6.4914E−01 | −7.3123E−01 | 5.9185E−01 |
| S12 | 5.5441E−02 | −6.4386E−02 | 1.0640E−02 | 1.3174E−02 | −1.0486E−02 |
| S13 | −2.5800E−01 | 1.5642E−01 | −7.7523E−02 | 3.0072E−02 | −8.0486E−03 |
| S14 | −1.1382E−01 | 5.8626E−02 | −2.5622E−02 | 8.3623E−03 | −1.9764E−03 |

| Surface No. | A14 | A16 | A18 | A20 |
|---|---|---|---|---|
| S1 | 1.3432E−01 | −1.9219E−01 | 9.7309E−02 | −1.7932E−02 |
| S2 | 2.9359E−01 | −2.1098E−01 | 8.2002E−02 | −1.2784E−02 |
| S3 | −4.5761E−01 | 3.4496E−01 | −1.3822E−01 | 2.3957E−02 |
| S4 | −2.2032E+00 | 1.5607E+00 | −6.2127E−01 | 1.0637E−01 |
| S5 | −7.8851E−01 | 5.4791E−01 | −2.1502E−01 | 3.3866E−02 |
| S6 | 2.7067E+00 | −2.6123E+00 | 1.3674E+00 | −2.9922E−01 |
| S7 | 4.1977E+00 | −3.6091E+00 | 1.7084E+00 | −3.4021E−01 |
| S8 | 8.1438E−01 | −5.5074E−01 | 1.9602E−01 | −2.9830E−02 |
| S9 | 8.1347E−01 | −5.5071E−01 | 1.9604E−01 | −2.9830E−02 |
| S10 | 8.5940E−02 | −3.3412E−02 | 6.2763E−03 | −4.3546E−04 |
| S11 | −3.2169E−01 | 1.0926E−01 | −2.0658E−02 | 1.6462E−03 |
| S12 | 3.6569E−03 | −6.9175E−04 | 6.8444E−05 | −2.7683E−06 |
| S13 | 1.4005E−03 | −1.5170E−04 | 9.3911E−06 | −2.5808E−07 |
| S14 | 3.3217E−04 | −3.7409E−05 | 2.4845E−06 | −7.2304E−08 |

TABLE 9

| | Parameter | | | | | | | | | |
|---|---|---|---|---|---|---|---|---|---|---|
| | f1 (mm) | f2 (mm) | f3 (mm) | f4 (mm) | f5 (mm) | f6 (mm) | f7 (mm) | f (mm) | TTL (mm) | ImgH (mm) |
| Value | 5.23 | 6.06 | −6.13 | −44.48 | 38.65 | 565.06 | −10.51 | 4.43 | 5.39 | 3.26 |

Figure 6A:
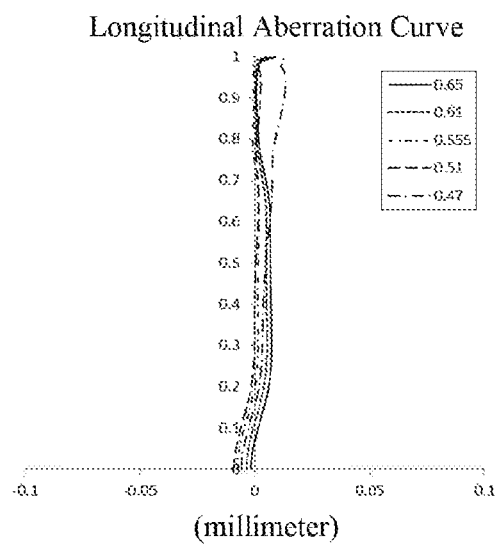
FIG. 6A illustrates a longitudinal aberration curve of the camera lens assembly of Embodiment 3.
Figure 6B:
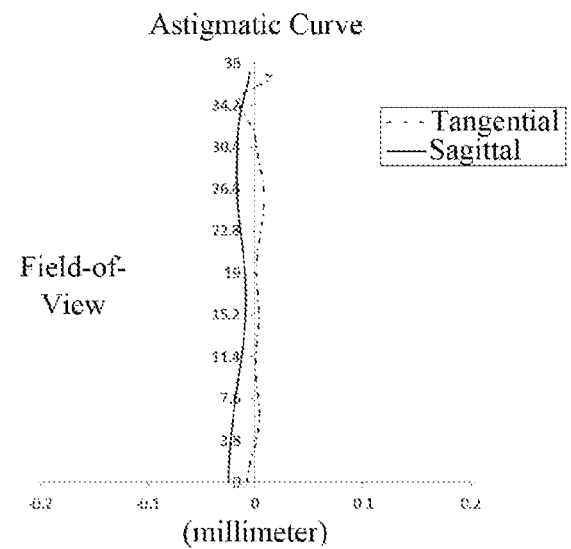
FIG. 6B illustrates an astigmatic curve of the camera lens assembly of Embodiment 3.
Figure 6C:
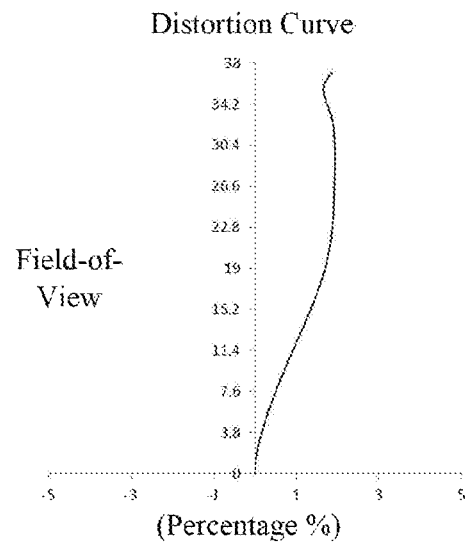
FIG. 6C illustrates a distortion curve of the camera lens assembly of Embodiment 3.
Figure 6D:
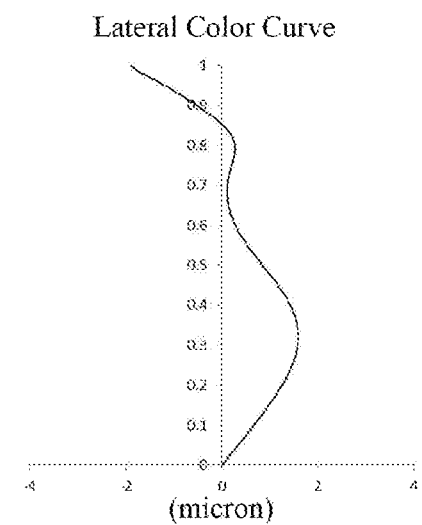
FIG. 6D illustrates a lateral color curve of the camera lens assembly of Embodiment 3.

FIG. 6A illustrates a longitudinal aberration curve of the camera lens assembly of Embodiment 3, which represents deviations of focal points of light of different wavelengths converged after passing through the optical system. FIG. 6B illustrates an astigmatic curve of the camera lens assembly of Embodiment 3, which shows a tangential image surface curvature and a sagittal image surface curvature. FIG. 6C illustrates a distortion curve of the camera lens assembly of Embodiment 3, which represents the distortion values in the case of different viewing angles. FIG. 6D illustrates a lateral color curve of the camera lens assembly of Embodiment 3, which represents the deviation of different image heights on the image plane after light passing through the camera lens assembly. It can be seen from FIGS. 6A to 6D that the camera lens assembly given in Embodiment 3 can achieve a good imaging quality.

Embodiment 4

Figure 7:
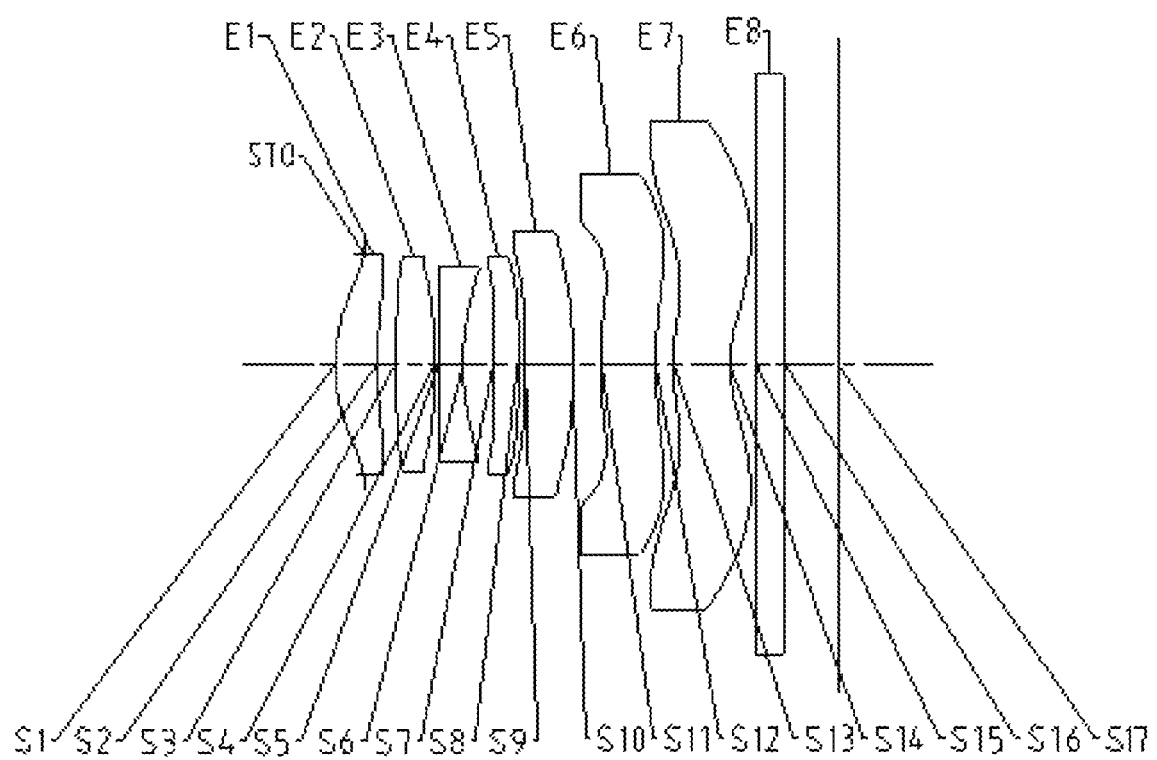
FIG. 7 is a schematic structural view illustrating a camera lens assembly according to Embodiment 4 of the present disclosure.

The camera lens assembly according to Embodiment 4 of the present disclosure is described below with reference to FIGS. 7 to 8D. FIG. 7 illustrates a schematic structural view of a camera lens assembly according to Embodiment 4 of the present disclosure.

As shown in FIG. 7, the camera lens assembly includes seven lenses E1-E7 sequentially arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 10 shows the surface type, the radius of curvature, the thickness, the material, and the conic coefficient of each lens of the camera lens assembly of Embodiment 4, wherein the unit of both the radius of curvature and the thickness is millimeter (mm). Table 11 shows the higher-order coefficients of each aspheric mirror surface in Embodiment 4. Table 12 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 4. The surface type of each aspheric surface may be defined by formula (1) given in the above-mentioned Embodiment 1.

TABLE 10

| Surface No. | Surface Type | Radius of Curvature | Thickness | Material Refractive Index | Abbe Number | Conic Coefficient |
|---|---|---|---|---|---|---|
| OBJ | spherical | infinite | infinite | | | |
| STO | spherical | infinite | −0.2934 | | | |
| S1 | aspheric | 1.8304 | 0.4322 | 1.54 | 56.1 | −12.3319 |
| S2 | aspheric | 3.9596 | 0.185 | | | −22.8678 |
| S3 | aspheric | 4.8265 | 0.4201 | 1.54 | 56.1 | −22.9473 |
| S4 | aspheric | −7.1540 | 0.03 | | | −15.3677 |
| S5 | aspheric | 10.5134 | 0.258 | 1.66 | 20.4 | 69.8443 |
| S6 | aspheric | 2.8193 | 0.3186 | | | −24.1459 |
| S7 | aspheric | 50.3330 | 0.25 | 1.64 | 23.5 | 99.0000 |
| S8 | aspheric | 30.2834 | 0.0785 | | | −99.0000 |
| S9 | aspheric | 1000.0000 | 0.4921 | 1.64 | 23.5 | −0.0240 |
| S10 | aspheric | −18.5714 | 0.2861 | | | −2855.4865 |
| S11 | aspheric | 5.8248 | 0.5767 | 1.64 | 23.5 | −191.8028 |
| S12 | aspheric | 6.2310 | 0.1788 | | | −19.4396 |
| S13 | aspheric | 2.0429 | 0.5716 | 1.54 | 56.1 | −2.1175 |
| S14 | aspheric | 1.3443 | 0.2726 | | | −4.6879 |
| S15 | spherical | infinite | 0.3 | 1.52 | 64.2 | |
| S16 | spherical | infinite | 0.5497 | | | |
| S17 | spherical | infinite | 0 | | | |

TABLE 11

| Surface No. | A4 | A6 | A8 | A10 | A12 |
|---|---|---|---|---|---|
| S1 | 2.2403E−01 | −3.2426E−01 | 3.7488E−01 | −2.7012E−01 | −7.2562E−02 |
| S2 | −1.2862E−02 | −6.7056E−02 | 5.2296E−02 | −3.6578E−02 | −1.4162E−05 |
| S3 | −4.6290E−02 | −2.0539E−02 | −2.9814E−02 | 1.3029E−01 | −4.6665E−02 |
| S4 | −3.5016E−02 | −2.4268E−02 | 6.3350E−02 | −2.4870E−01 | 7.3138E−01 |
| S5 | −5.1834E−02 | 8.6437E−02 | −3.3122E−01 | 7.7348E−01 | −1.1543E+00 |
| S6 | 8.5521E−02 | −1.0707E−01 | 1.1040E−01 | 5.2555E−02 | −5.6048E−01 |
| S7 | −5.2359E−02 | 2.6074E−02 | −2.4560E−01 | 1.0545E+00 | −2.4919E+00 |
| S8 | −8.4903E−02 | −5.8452E−03 | −3.6737E−03 | 2.3356E−01 | −6.4251E−01 |
| S9 | −9.0836E−02 | 4.7373E−02 | −1.5268E−01 | 5.4190E−01 | −1.0251E+00 |
| S10 | −8.5980E−02 | 6.9448E−03 | −2.9342E−02 | 1.4192E−01 | −2.0115E−01 |
| S11 | 1.8254E−01 | −4.6300E−01 | 6.4862E−01 | −7.3117E−01 | 5.9189E−01 |
| S12 | 4.7084E−02 | −4.3637E−02 | −1.5555E−02 | 3.1141E−02 | −1.8187E−02 |
| S13 | −2.8681E−01 | 1.7977E−01 | −9.2497E−02 | 3.7442E−02 | −1.0521E−02 |
| S14 | −1.2731E−01 | 6.5898E−02 | −2.8020E−02 | 8.3989E−03 | −1.7376E−03 |

| Surface No. | A14 | A16 | A18 | A20 |
|---|---|---|---|---|
| S1 | 3.5995E−01 | −3.5065E−01 | 1.5949E−01 | −2.8595E−02 |
| S2 | 6.7642E−02 | −8.9330E−02 | 4.9806E−02 | −1.0231E−02 |
| S3 | −1.0115E−01 | 1.2816E−01 | −6.1725E−02 | 1.2065E−02 |
| S4 | −1.1893E+00 | 1.0513E+00 | −4.7960E−01 | 8.9713E−02 |
| S5 | 1.0089E+00 | −4.6268E−01 | 9.2837E−02 | −4.1415E−03 |
| S6 | 1.1633E+00 | −1.2092E+00 | 6.6082E−01 | −1.4898E−01 |
| S7 | 3.4684E+00 | −2.8711E+00 | 1.3108E+00 | −2.5284E−01 |
| S8 | 8.1359E−01 | −5.5072E−01 | 1.9603E−01 | −2.9830E−02 |
| S9 | 1.1093E+00 | −6.9054E−01 | 2.3288E−01 | −3.3977E−02 |
| S10 | 1.4433E−01 | −5.4364E−02 | 9.7612E−03 | −5.9821E−04 |
| S11 | −3.2168E−01 | 1.0927E−01 | −2.0657E−02 | 1.6464E−03 |
| S12 | 5.7615E−03 | −1.0458E−03 | 1.0191E−04 | −4.1395E−06 |
| S13 | 1.9425E−03 | −2.2552E−04 | 1.5024E−05 | −4.4094E−07 |
| S14 | 2.5656E−04 | −2.7005E−05 | 1.8069E−06 | −5.5515E−08 |

TABLE 12

| | Parameter | | | | | | | | | |
|---|---|---|---|---|---|---|---|---|---|---|
| | f1 (mm) | f2 (mm) | f3 (mm) | f4 (mm) | f5 (mm) | f6 (mm) | f7 (mm) | f (mm) | TTL (mm) | ImgH (mm) |
| Value | 5.82 | 5.35 | −5.85 | −118.52 | 28.29 | 89.82 | −10.23 | 4.18 | 5.20 | 3.26 |

Figure 8A:
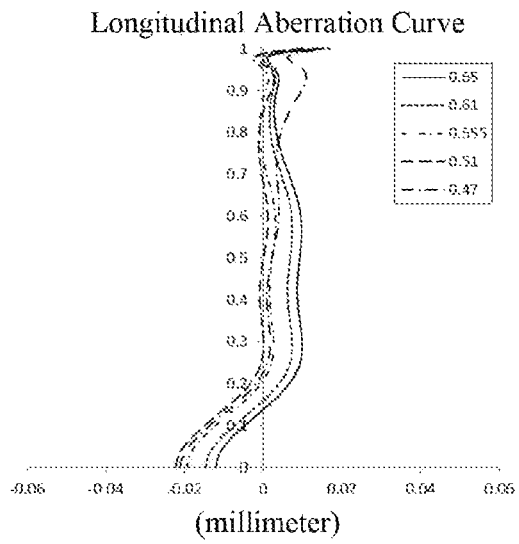
FIG. 8A illustrates a longitudinal aberration curve of the camera lens assembly of Embodiment 4.
Figure 8B:
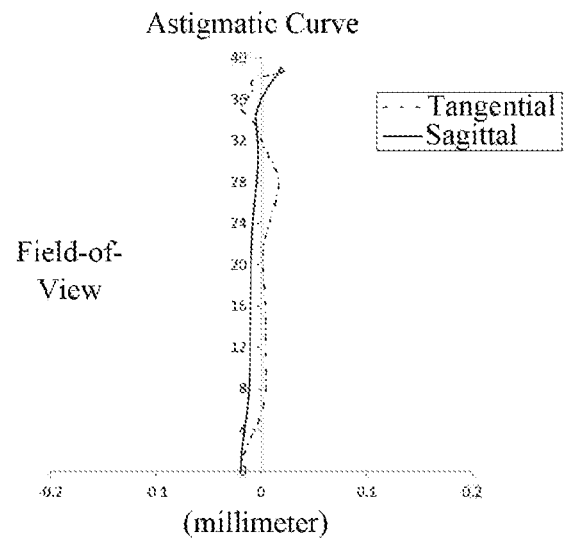
FIG. 8B illustrates an astigmatic curve of the camera lens assembly of Embodiment 4.
Figure 8C:
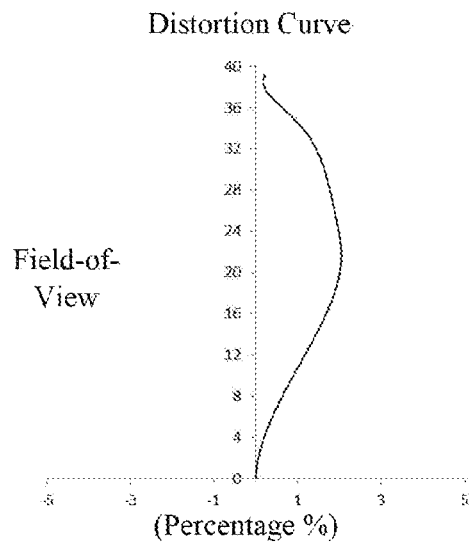
FIG. 8C illustrates a distortion curve of the camera lens assembly of Embodiment 4.
Figure 8D:
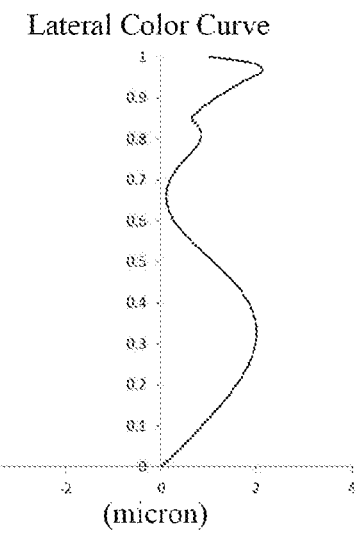
FIG. 8D illustrates a lateral color curve of the camera lens assembly of Embodiment 4.

FIG. 8A illustrates a longitudinal aberration curve of the camera lens assembly of Embodiment 4, which represents deviations of focal points of light of different wavelengths converged after passing through the optical system. FIG. 8B illustrates an astigmatic curve of the camera lens assembly of Embodiment 4, which shows a tangential image surface curvature and a sagittal image surface curvature. FIG. 8C illustrates a distortion curve of the camera lens assembly of Embodiment 4, which represents the distortion values in the case of different viewing angles. FIG. 8D illustrates a lateral color curve of the camera lens assembly of Embodiment 4, which represents the deviation of different image heights on the image plane after light passing through the camera lens assembly. It can be seen from FIGS. 8A to 8D that the camera lens assembly given in Embodiment 4 can achieve a good imaging quality.

Embodiment 5

The camera lens assembly according to Embodiment 5 of the present disclosure is described below with reference to FIGS. 9 to 10D. FIG. 3 illustrates a schematic structural view of a camera lens assembly according to Embodiment 5 of the present disclosure.

Figure 9:
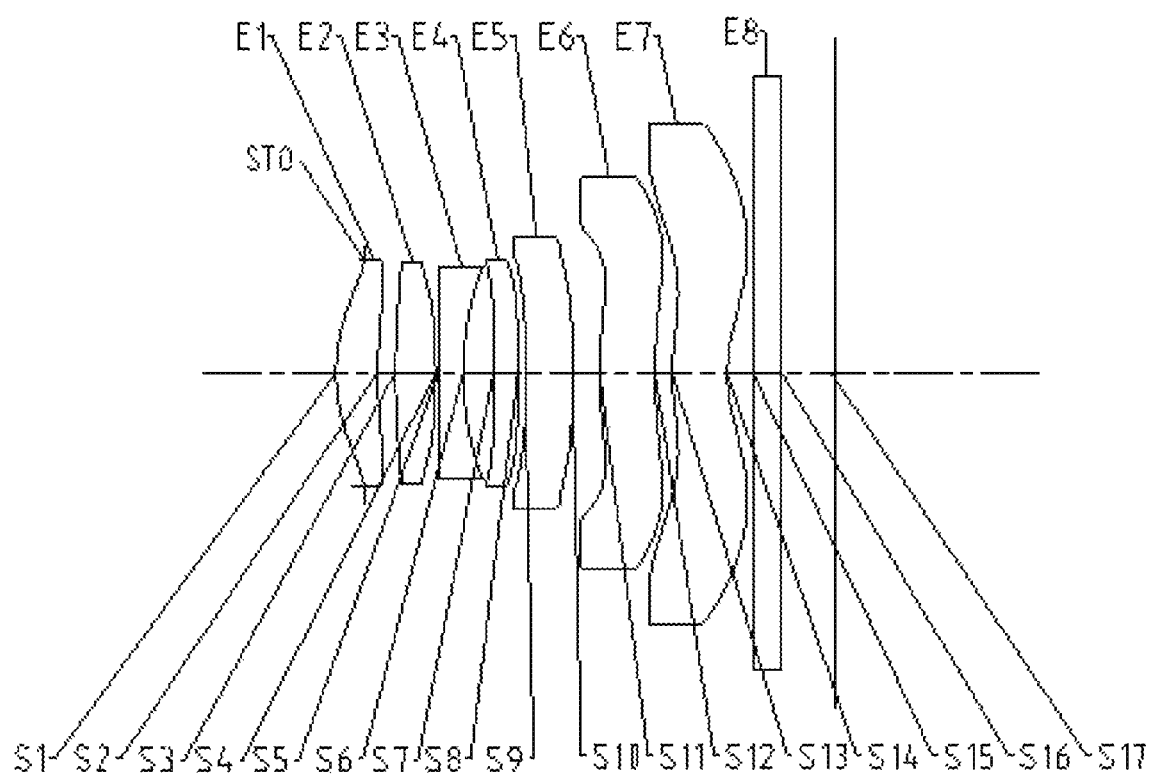
FIG. 9 is a schematic structural view illustrating a camera lens assembly according to Embodiment 5 of the present disclosure.

As shown in FIG. 9, the camera lens assembly sequentially includes seven lenses E1-E7 arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 13 shows the surface type, the radius of curvature, the thickness, the material, and the conic coefficient of each lens of the camera lens assembly of Embodiment 5, wherein the unit of both the radius of curvature and the thickness is millimeter (mm). Table 14 shows the higher-order coefficients of each aspheric mirror surface in Embodiment 5. Table 15 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 5. The surface type of each aspheric surface may be defined by formula (1) given in the above-mentioned Embodiment 1.

TABLE 13

| Surface No. | Surface Type | Radius of Curvature | Thickness | Material | | Conic Coefficient |
|---|---|---|---|---|---|---|
| | | | | Refractive Index | Abbe Number | |
| OBJ | spherical | infinite | infinite | | | |
| STO | spherical | infinite | −0.2934 | | | |
| S1 | aspheric | 1.8304 | 0.4322 | 1.54 | 56.1 | −12.2851 |
| S2 | aspheric | 4.0276 | 0.185 | | | −23.0113 |
| S3 | aspheric | 4.9258 | 0.4201 | 1.54 | 56.1 | −23.1068 |
| S4 | aspheric | −7.1599 | 0.03 | | | −15.1951 |
| S5 | aspheric | 10.4965 | 0.258 | 1.66 | 20.4 | 69.8873 |
| S6 | aspheric | 2.8078 | 0.3186 | | | −23.9990 |
| S7 | aspheric | 37.4082 | 0.25 | 1.64 | 23.5 | −52.5242 |
| S8 | aspheric | 31.1665 | 0.0785 | | | −99.0000 |
| S9 | aspheric | 105.3280 | 0.4921 | 1.64 | 23.5 | −99.0000 |
| S10 | aspheric | 796.7761 | 0.2861 | | | 11045.8745 |
| S11 | aspheric | 4.6874 | 0.5767 | 1.64 | 23.5 | −135.6746 |
| S12 | aspheric | 6.9100 | 0.1788 | | | −20.1757 |
| S13 | aspheric | 2.1365 | 0.5716 | 1.54 | 56.1 | −2.1078 |
| S14 | aspheric | 1.3550 | 0.2726 | | | −4.7955 |
| S15 | spherical | infinite | 0.3 | 1.52 | 64.2 | |
| S16 | spherical | infinite | 0.5497 | | | |
| S17 | spherical | infinite | 0 | | | |

TABLE 14

| Surface No. | A4 | A6 | A8 | A10 | A12 |
|---|---|---|---|---|---|
| S1 | 2.2389E−01 | −3.2133E−01 | 3.6120E−01 | −2.3247E−01 | −1.3524E−01 |
| S2 | −1.3201E−02 | −6.4667E−02 | 3.6290E−02 | 1.8157E−02 | −1.0151E−01 |
| S3 | −4.4938E−02 | −3.2441E−02 | 1.0593E−02 | 5.4752E−02 | 4.1859E−02 |
| S4 | −3.4899E−02 | −2.9639E−02 | 8.8746E−02 | −2.8783E−01 | 7.2344E−01 |
| S5 | −5.0328E−02 | 6.2748E−02 | −1.9712E−01 | 4.0869E−01 | −6.0395E−01 |
| S6 | 8.3251E−02 | −9.3150E−02 | 5.7934E−02 | 2.3067E−01 | −9.7296E−01 |
| S7 | −6.1542E−02 | 5.5372E−02 | −2.8190E−01 | 1.0208E+00 | −2.2870E+00 |
| S8 | −8.4358E−02 | −5.9192E−03 | −3.6638E−03 | 2.3360E−01 | −6.4246E−01 |
| S9 | −8.4433E−02 | 1.9082E−03 | 1.3044E−03 | 2.3395E−01 | −6.4394E−01 |
| S10 | −8.2792E−02 | 1.8437E−02 | −1.0051E−01 | 2.9916E−01 | −3.9228E−01 |
| S11 | 1.8200E−01 | −4.6263E−01 | 6.4872E−01 | −7.3116E−01 | 5.9189E−01 |
| S12 | 4.6129E−02 | −4.1219E−02 | −1.7894E−02 | 3.2261E−02 | −1.8501E−02 |
| S13 | −2.8187E−01 | 1.7343E−01 | −8.7135E−02 | 3.4531E−02 | −9.5202E−03 |
| S14 | −1.2566E−01 | 6.4152E−02 | −2.6578E−02 | 7.7326E−03 | −1.5415E−03 |

| Surface No. | A14 | A16 | A18 | A20 |
|---|---|---|---|---|
| S1 | 4.2449E−01 | −3.9139E−01 | 1.7395E−01 | −3.0789E−02 |
| S2 | 1.7730E−01 | −1.5917E−01 | 7.4216E−02 | −1.3840E−02 |
| S3 | −1.7171E−01 | 1.6758E−01 | −7.5837E−02 | 1.4421E−02 |
| S4 | −1.1002E+00 | 9.4713E−01 | −4.2815E−01 | 8.0086E−02 |
| S5 | 5.2034E−01 | −2.0816E−01 | 2.0875E−02 | 4.3633E−03 |
| S6 | 1.7342E+00 | −1.6650E+00 | 8.5567E−01 | −1.8361E−01 |
| S7 | 3.1275E+00 | −2.5839E+00 | 1.1871E+00 | −2.3134E−01 |
| S8 | 8.1359E−01 | −5.5072E−01 | 1.9603E−01 | −2.9830E−02 |
| S9 | 8.1360E−01 | −5.5072E−01 | 1.9603E−01 | −2.9830E−02 |
| S10 | 2.8334E−01 | −1.1475E−01 | 2.4216E−02 | −2.0641E−03 |
| S11 | −3.2168E−01 | 1.0927E−01 | −2.0657E−02 | 1.6464E−03 |
| S12 | 5.8139E−03 | −1.0507E−03 | 1.0213E−04 | −4.1417E−06 |
| S13 | 1.7248E−03 | −1.9646E−04 | 1.2845E−05 | −3.7056E−07 |
| S14 | 2.1718E−04 | −2.1832E−05 | 1.4171E−06 | −4.3005E−08 |

TABLE 15

| | Parameter | | | | | | | | |
|---|---|---|---|---|---|---|---|---|---|
| | f1 (mm) | f2 (mm) | f3 (mm) | f4 (mm) | f5 (mm) | f6 (mm) | f7 (mm) | f (mm) | TTL (mm) | ImgH (mm) |
| Value | 5.75 | 5.41 | −5.83 | −294.40 | 188.24 | 20.52 | −9.15 | 4.20 | 5.20 | 3.26 |

Figure 10A:
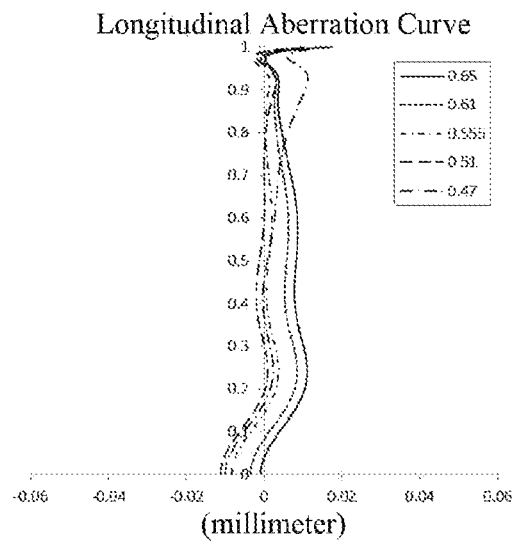
FIG. 10A illustrates a longitudinal aberration curve of the camera lens assembly of Embodiment 5.
Figure 10B:
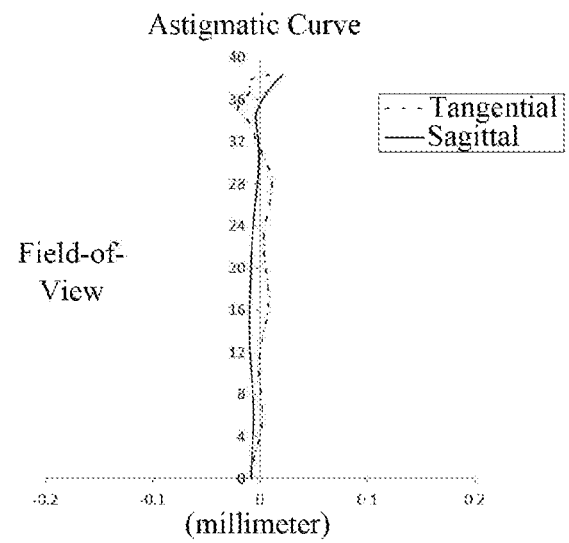
FIG. 10B illustrates an astigmatic curve of the camera lens assembly of Embodiment 5.
Figure 10C:
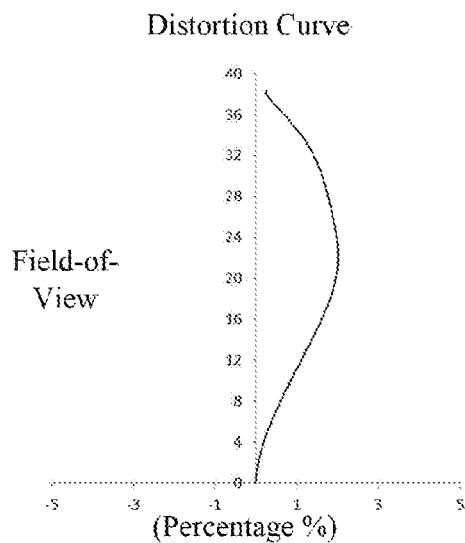
FIG. 10C illustrates a distortion curve of the camera lens assembly of Embodiment 5.
Figure 10D:
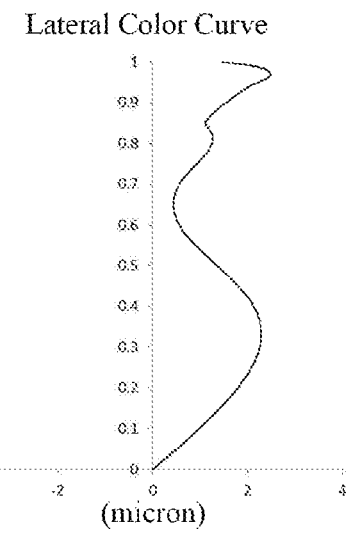
FIG. 10D illustrates a lateral color curve of the camera lens assembly of Embodiment 5.

FIG. 10A illustrates a longitudinal aberration curve of the camera lens assembly of Embodiment 5, which represents deviations of focal points of light of different wavelengths converged after passing through the optical system. FIG. 10B illustrates an astigmatic curve of the camera lens assembly of Embodiment 5, which shows a tangential image surface curvature and a sagittal image surface curvature. FIG. 10C illustrates a distortion curve of the camera lens assembly of Embodiment 5, which represents the distortion values in the case of different viewing angles. FIG. 10D illustrates a lateral color curve of the camera lens assembly of Embodiment 5, which represents the deviation of different image heights on the image plane after light passing through the camera lens assembly. It can be seen from FIGS. 10A to 10D that the camera lens assembly given in Embodiment 5 can achieve a good imaging quality.

Embodiment 6

Figure 11:
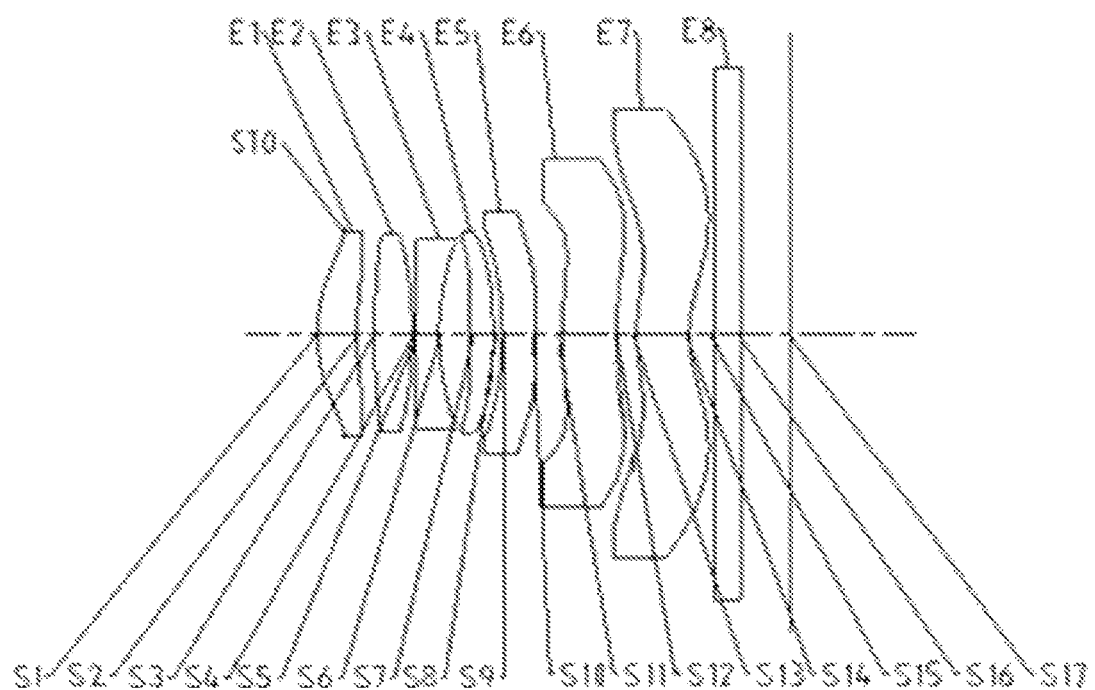
FIG. 11 is a schematic structural view illustrating a camera lens assembly according to Embodiment 6 of the present disclosure.

The camera lens assembly according to Embodiment 6 of the present disclosure is described below with reference to FIGS. 11 to 12D. FIG. 11 illustrates a schematic structural view of a camera lens assembly according to Embodiment 6 of the present disclosure.

As shown in FIG. 11, the camera lens assembly sequentially includes seven lenses E1-E7 arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 16 shows the surface type, the radius of curvature, the thickness, the material, and the conic coefficient of each lens of the camera lens assembly of Embodiment 6, wherein the unit of both the radius of curvature and the thickness is millimeter (mm). Table 17 shows the higher-order coefficients of each aspheric mirror surface in Embodiment 6. Table 18 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 6. The surface type of each aspheric surface may be defined by formula (1) given in the above-mentioned Embodiment 1.

TABLE 16

| Surface No. | Surface Type | Radius of Curvature | Thickness | Material Refractive Index | Abbe Number | Conic Coefficient |
|---|---|---|---|---|---|---|
| OBJ | spherical | infinite | infinite | | | |
| STO | spherical | infinite | −0.2938 | | | |
| S1 | aspheric | 1.8301 | 0.4379 | 1.54 | 56.1 | −12.3728 |
| S2 | aspheric | 3.6626 | 0.1805 | | | −21.3694 |
| S3 | aspheric | 4.4099 | 0.427 | 1.54 | 56.1 | −19.2486 |
| S4 | aspheric | −7.0297 | 0.03 | | | −19.1453 |
| S5 | aspheric | 10.7761 | 0.258 | 1.66 | 20.4 | 70.1801 |
| S6 | aspheric | 2.7840 | 0.3501 | | | −25.1283 |
| S7 | aspheric | −35.5522 | 0.25 | 1.64 | 23.5 | −77.5697 |
| S8 | aspheric | −5.6734 | 0.1027 | | | −99.0000 |
| S9 | aspheric | −4.3016 | 0.3753 | 1.64 | 23.5 | −99.0000 |
| S10 | aspheric | −6.9152 | 0.2811 | | | −415.6024 |
| S11 | aspheric | 6.8000 | 0.596 | 1.64 | 23.5 | −179.3103 |
| S12 | aspheric | 6.0503 | 0.2173 | | | −25.7098 |
| S13 | aspheric | 1.9536 | 0.5744 | 1.54 | 56.1 | −2.4740 |
| S14 | aspheric | 1.3403 | 0.2707 | | | −4.2473 |
| S15 | spherical | infinite | 0.3 | 1.52 | 64.2 | |
| S16 | spherical | infinite | 0.5491 | | | |
| S17 | spherical | infinite | 0 | | | |

TABLE 17

| Surface No. | A4 | A6 | A8 | A10 | A12 |
|---|---|---|---|---|---|
| S1 | 2.2378E−01 | −3.2805E−01 | 3.9242E−01 | −3.3198E−01 | 6.2972E−02 |
| S2 | −4.8330E−03 | −9.2887E−02 | 1.3267E−01 | −2.5442E−01 | 3.8644E−01 |
| S3 | −3.9768E−02 | −2.4737E−02 | −3.5924E−02 | 1.3163E−01 | −4.0276E−02 |
| S4 | −4.9095E−02 | 9.0365E−02 | −3.1474E−01 | 5.0686E−01 | −2.7501E−01 |
| S5 | −7.9525E−02 | 2.1949E−01 | −7.1530E−01 | 1.5039E+00 | −2.0829E+00 |
| S6 | 8.1180E−02 | −9.5046E−02 | 9.6200E−02 | 4.9803E−02 | −5.2282E−01 |
| S7 | −6.0061E−02 | 6.5821E−02 | −3.5610E−01 | 1.2419E+00 | −2.6664E+00 |
| S8 | −8.3799E−02 | −4.5087E−03 | −2.4146E−03 | 2.3349E−01 | −6.4324E−01 |
| S9 | −8.5907E−02 | 2.8808E−03 | 1.3921E−03 | 2.3419E−01 | −6.4371E−01 |
| S10 | −5.4363E−02 | −5.8127E−02 | 4.1667E−02 | 7.7077E−02 | −1.4811E−01 |
| S11 | 1.8572E−01 | −4.6530E−01 | 6.4862E−01 | −7.3107E−01 | 5.9192E−01 |
| S12 | 4.2958E−02 | −3.8144E−02 | −1.7949E−02 | 3.0445E−02 | −1.7047E−02 |
| S13 | −2.7483E−01 | 1.7042E−01 | −8.7469E−02 | 3.4597E−02 | −9.2922E−03 |
| S14 | −1.3672E−01 | 7.6015E−02 | −3.5259E−02 | 1.1645E−02 | −2.6583E−03 |

| Surface No. | A14 | A16 | A18 | A20 |
|---|---|---|---|---|
| S1 | 1.8434E−01 | −2.1725E−01 | 1.0501E−01 | −1.9457E−02 |
| S2 | −3.5687E−01 | 1.9302E−01 | −5.4360E−02 | 5.9799E−03 |
| S3 | −9.4433E−02 | 1.0938E−01 | −4.9493E−02 | 9.2406E−03 |
| S4 | −2.7459E−01 | 5.0122E−01 | −2.8197E−01 | 5.7591E−02 |
| S5 | 1.8031E+00 | −9.0727E−01 | 2.4076E−01 | −2.6241E−02 |
| S6 | 1.0996E+00 | −1.1481E+00 | 6.2469E−01 | −1.3931E−01 |
| S7 | 3.4934E+00 | −2.7605E+00 | 1.2097E+00 | −2.2460E−01 |
| S8 | 8.1359E−01 | −5.5072E−01 | 1.9603E−01 | −2.9830E−02 |
| S9 | 8.1360E−01 | −5.5072E−01 | 1.9603E−01 | −2.9830E−02 |
| S10 | 1.0662E−01 | −3.4444E−02 | 3.5919E−03 | 1.9656E−04 |
| S11 | −3.2167E−01 | 1.0927E−01 | −2.0658E−02 | 1.6459E−03 |
| S12 | 5.2659E−03 | −9.3826E−04 | 9.0005E−05 | −3.6028E−06 |
| S13 | 1.6177E−03 | −1.7594E−04 | 1.0969E−05 | −3.0262E−07 |
| S14 | 4.1965E−04 | −4.4282E−05 | 2.7964E−06 | −7.8798E−08 |

TABLE 18

| | Parameter | | | | | | | | |
|---|---|---|---|---|---|---|---|---|---|
| | f1 (mm) | f2 (mm) | f3 (mm) | f4 (mm) | f5 (mm) | f6 (mm) | f7 (mm) | f (mm) | TTL (mm) | ImgH (mm) |
| Value | 6.18 | 5.03 | −5.70 | −10.44 | 18.71 | −123.66 | −11.69 | 4.20 | 5.20 | 3.26 |

Figure 12A:
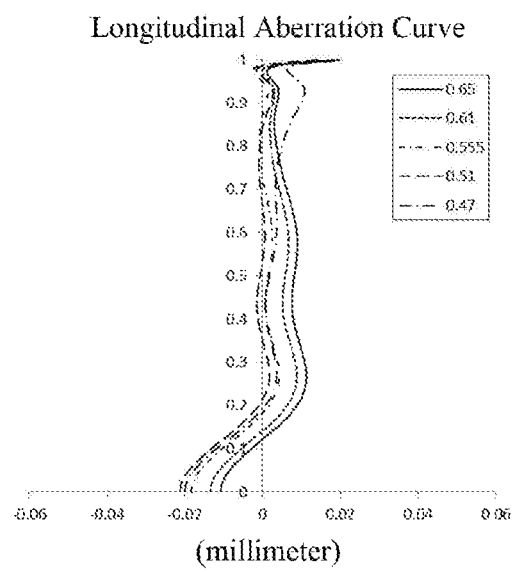
FIG. 12A illustrates a longitudinal aberration curve of the camera lens assembly of Embodiment 6.
Figure 12B:
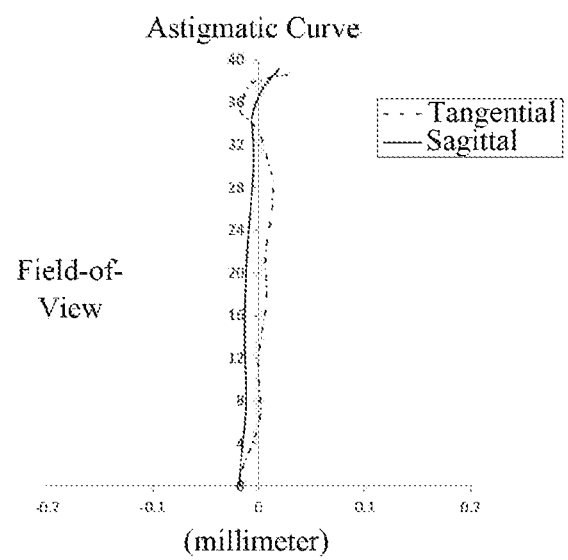
FIG. 12B illustrates an astigmatic curve of the camera lens assembly of Embodiment 6.
Figure 12C:
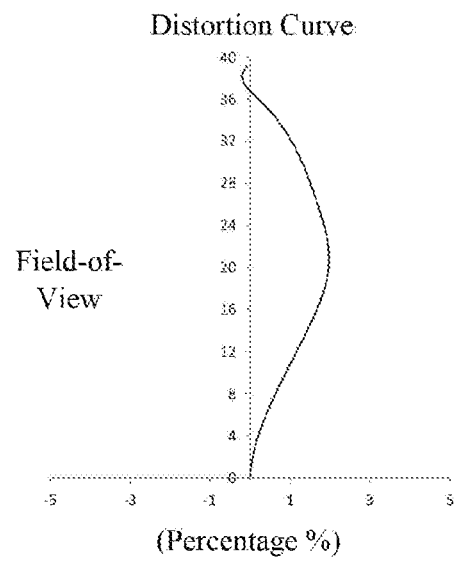
FIG. 12C illustrates a distortion curve of the camera lens assembly of Embodiment 6.
Figure 12D:
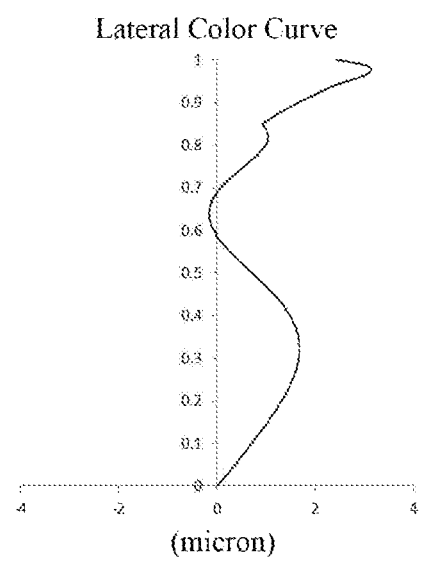
FIG. 12D illustrates a lateral color curve of the camera lens assembly of Embodiment 6.

FIG. 12A illustrates a longitudinal aberration curve of the camera lens assembly of Embodiment 6, which represents deviations of focal points of light of different wavelengths converged after passing through the optical system. FIG. 12B illustrates an astigmatic curve of the camera lens assembly of Embodiment 6, which shows a tangential image surface curvature and a sagittal image surface curvature. FIG. 12C illustrates a distortion curve of the camera lens assembly of Embodiment 6, which represents the distortion values in the case of different viewing angles. FIG. 12D illustrates a lateral color curve of the camera lens assembly of Embodiment 6, which represents the deviation of different image heights on the image plane after light passing through the camera lens assembly. It can be seen from FIGS. 12A to 12D that the camera lens assembly given in Embodiment 6 can achieve a good imaging quality.

Embodiment 7

Figure 13:
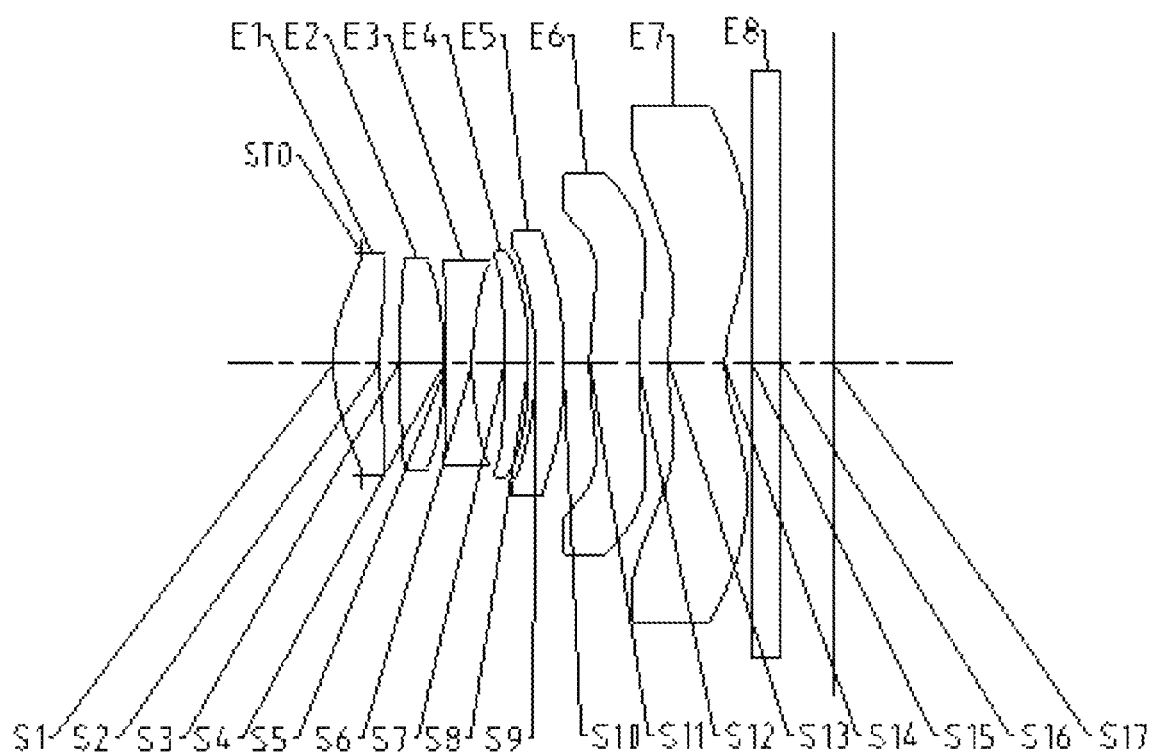
FIG. 13 is a schematic structural view illustrating a camera lens assembly according to Embodiment 7 of the present disclosure.

The camera lens assembly according to Embodiment 7 of the present disclosure is described below with reference to FIGS. 13 to 14D. FIG. 13 illustrates a schematic structural view of a camera lens assembly according to Embodiment 7 of the present disclosure.

As shown in FIG. 13, the camera lens assembly sequentially includes seven lenses E1-E7 arranged from an object side to an imaging side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; the sixth lens E6 has an object side surface S11 and an image side surface S12; and the seventh lens E7 has an object side surface S13 and an image side surface S14. Alternatively, the camera lens assembly may further include an optical filter E8 having an object side surface S15 and an image side surface S16, and the optical filter E8 may be used to correct a color deviation. In the camera lens assembly of the present embodiment, an aperture STO for limiting the light beam may be further provided. It should be understood by those skilled in the art that the aperture STO may be disposed at any lens as required, i.e., the disposing of the aperture STO should not be limited to the position shown in the accompanying drawings. Light from an object sequentially passes through the respective surfaces S1 to S16 and finally forms an image on the image plane S17.

Table 19 shows the surface type, the radius of curvature, the thickness, the material, and the conic coefficient of each lens of the camera lens assembly of Embodiment 7, wherein the unit of both the radius of curvature and the thickness is millimeter (mm). Table 20 shows the higher-order coefficients of each aspheric mirror surface in Embodiment 7. Table 21 shows the effective focal lengths f1 to f7 of the lenses, the total effective focal length f of the camera lens assembly, the distance TTL from the object side surface S1 of the first lens E1 to the image plane S17 of the camera lens assembly on the optical axis, and the half a diagonal length ImgH of an effective pixel area on the image plane S17 of Embodiment 7. The surface type of each aspheric surface may be defined by formula (1) given in the above-mentioned Embodiment 1.

TABLE 19

| | | | | Material | | |
|---|---|---|---|---|---|---|
| Surface No. | Surface Type | Radius of Curvature | Thickness | Refractive Index | Abbe Number | Conic Coefficient |
| OBJ | spherical | infinite | infinite | | | |
| STO | spherical | infinite | −0.2873 | | | |
| S1 | aspheric | 1.8638 | 0.4733 | 1.54 | 56.1 | −12.7540 |
| S2 | aspheric | 3.9596 | 0.1988 | | | −20.9505 |
| S3 | aspheric | 5.2841 | 0.479 | 1.54 | 56.1 | −17.4829 |
| S4 | aspheric | −4.4598 | 0.03 | | | −16.1135 |
| S5 | aspheric | −127.3000 | 0.2599 | 1.66 | 20.4 | −90.0000 |
| S6 | aspheric | 3.1001 | 0.3344 | | | −33.1413 |
| S7 | aspheric | −49.4728 | 0.252 | 1.64 | 23.5 | 99.0000 |
| S8 | aspheric | −4.7887 | 0.07 | | | −99.0000 |
| S9 | aspheric | −3.8881 | 0.2882 | 1.64 | 23.5 | −99.0000 |
| S10 | aspheric | −7.7744 | 0.2795 | | | −657.5371 |
| S11 | aspheric | 4.6353 | 0.5054 | 1.64 | 23.5 | −95.8183 |
| S12 | aspheric | 6.0495 | 0.3032 | | | −32.8830 |
| S13 | aspheric | 2.1623 | 0.5922 | 1.54 | 56.1 | −2.9046 |
| S14 | aspheric | 1.3359 | 0.2851 | | | −4.2413 |
| S15 | spherical | infinite | 0.3 | 1.52 | 64.2 | |
| S16 | spherical | infinite | 0.5491 | | | |
| S17 | spherical | infinite | 0 | | | |

TABLE 20

| Surface No. | A4 | A6 | A8 | A10 | A12 |
|---|---|---|---|---|---|
| S1 | 2.1401E−01 | −2.7370E−01 | 1.6070E−01 | 2.7885E−01 | −9.2629E−01 |
| S2 | −3.7075E−03 | −1.1889E−01 | 2.7341E−01 | −6.1605E−01 | 9.4573E−01 |
| S3 | −4.4386E−02 | 1.1337E−02 | −2.2221E−01 | 7.5126E−01 | −1.2785E+00 |
| S4 | −5.5140E−02 | 1.5927E−01 | −7.6520E−01 | 1.8960E+00 | −2.7261E+00 |
| S5 | −8.1149E−02 | 3.4171E−01 | −1.4280E+00 | 3.6905E+00 | −6.0562E+00 |
| S6 | 6.9306E−02 | −8.0939E−02 | 1.0633E−01 | −9.3708E−01 | −5.8466E−02 |
| S7 | −4.6560E−02 | −3.1477E−02 | 1.3587E−01 | −2.7138E−01 | 2.9841E−01 |
| S8 | −8.6436E−02 | −5.0549E−03 | −2.9597E−03 | 2.3263E−01 | −6.4365E−01 |
| S9 | −8.5305E−02 | 2.1452E−03 | 1.0101E−03 | 2.3423E−01 | −6.4378E−01 |
| S10 | −7.4388E−02 | −5.1370E−02 | 7.3928E−02 | 4.3870E−03 | −6.5782E−02 |
| S11 | 1.8839E−01 | −4.6617E−01 | 6.4859E−01 | −7.3103E−01 | 5.9194E−01 |
| S12 | 3.9513E−02 | −3.3869E−02 | −3.0299E−02 | 4.0837E−02 | −2.1455E−02 |
| S13 | −2.6438E−01 | 1.4452E−01 | −6.0219E−02 | 1.7658E−02 | −2.7432E−03 |
| S14 | −1.2983E−01 | 7.0183E−02 | −3.0654E−02 | 9.7019E−03 | −2.1518E−03 |

| Surface No. | A14 | A16 | A18 | A20 |
|---|---|---|---|---|
| S1 | 1.1804E+00 | −8.2224E−01 | 3.0768E−01 | −4.8368E−02 |
| S2 | −9.0512E−01 | 5.2868E−01 | −1.7134E−01 | 2.3366E−02 |
| S3 | 1.3986E+00 | −9.5480E−01 | 3.6524E−01 | −5.9426E−02 |
| S4 | 2.3711E+00 | −1.2304E+00 | 3.5142E−01 | −4.2385E−02 |
| S5 | 6.2577E+00 | −3.9378E+00 | 1.3863E+00 | −2.1058E−01 |
| S6 | 2.9887E−01 | −3.6853E−01 | 2.1824E−01 | −5.1559E−02 |
| S7 | −1.7500E−01 | 1.3670E−02 | 4.1549E−02 | −1.5133E−02 |
| S8 | 8.1359E−01 | −5.5072E−01 | 1.9603E−01 | −2.9830E−02 |
| S9 | 8.1360E−01 | −5.5072E−01 | 1.9603E−01 | −2.9830E−02 |
| S10 | 4.8712E−02 | −8.4768E−03 | −3.2444E−03 | 9.8257E−04 |
| S11 | −3.2167E−01 | 1.0927E−01 | −2.0658E−02 | 1.6457E−03 |
| S12 | 6.0519E−03 | −8.8857E−04 | 5.2537E−05 | 1.0654E−07 |
| S13 | 5.2366E−05 | 4.6328E−05 | −6.0041E−06 | 2.2573E−07 |
| S14 | 3.3215E−04 | −3.4357E−05 | 2.1312E−06 | −5.9159E−08 |

TABLE 21

| | | | | Parameter | | | | | |
|---|---|---|---|---|---|---|---|---|---|
| f1 (mm) | f2 (mm) | f3 (mm) | f4 (mm) | f5 (mm) | f6 (mm) | f7 (mm) | f (mm) | TTL (mm) | ImgH (mm) |
| Value 5.97 | 4.51 | −4.53 | 8.21 | −12.43 | 26.98 | −8.57 | 4.17 | 5.20 | 3.46 |

Figure 14A:
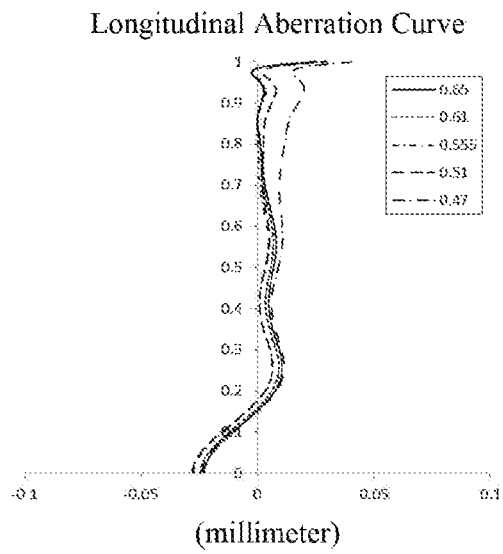
FIG. 14A illustrates a longitudinal aberration curve of the camera lens assembly of Embodiment 7.
Figure 14B:
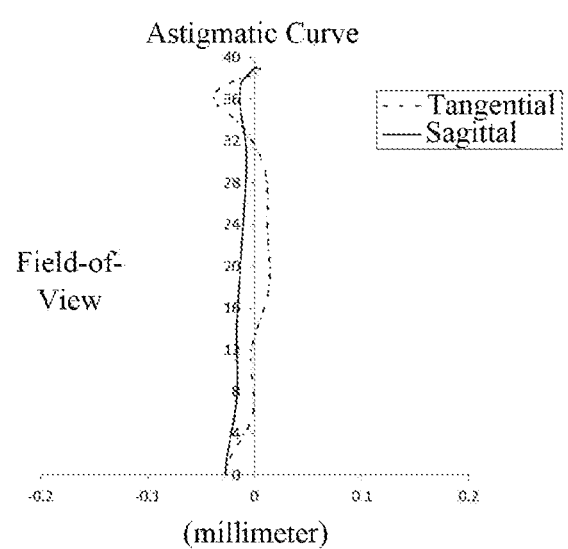
FIG. 14B illustrates an astigmatic curve of the camera lens assembly of Embodiment 7.
Figure 14C:
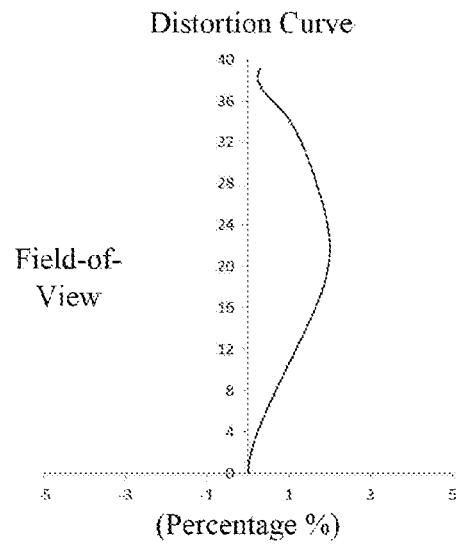
FIG. 14C illustrates a distortion curve of the camera lens assembly of Embodiment 7.
Figure 14D:
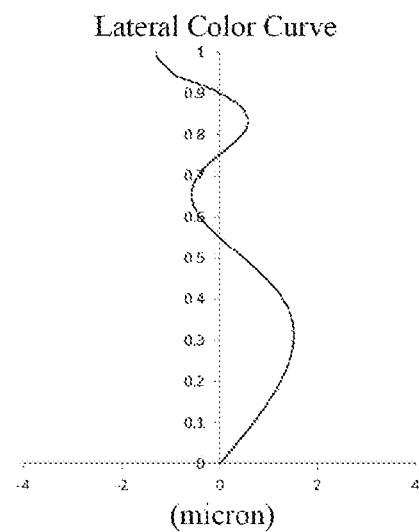
FIG. 14D illustrates a lateral color curve of the camera lens assembly of Embodiment 7.

FIG. 14A illustrates a longitudinal aberration curve of the camera lens assembly of Embodiment 7, which represents deviations of focal points of light of different wavelengths converged after passing through the optical system. FIG. 14B illustrates an astigmatic curve of the camera lens assembly of Embodiment 7, which shows a tangential image surface curvature and a sagittal image surface curvature. FIG. 14C illustrates a distortion curve of the camera lens assembly of Embodiment 7, which represents the distortion values in the case of different viewing angles. FIG. 14D illustrates a lateral color curve of the camera lens assembly of Embodiment 7, which represents the deviation of different image heights on the image plane after light passing through the camera lens assembly. It can be seen from FIGS. 14A to 14D that the camera lens assembly given in Embodiment 7 can achieve a good imaging quality.

In summary, Embodiment 1 to Embodiment 7 respectively satisfy the relationships shown in Table 22 below.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.79 | 1.82 | 1.90 | 1.79 | 1.79 | 1.79 | 1.79 |
| TTL/ImgH | 1.49 | 1.62 | 1.65 | 1.59 | 1.59 | 1.59 | 1.50 |
| f1/f2 | 1.30 | 1.20 | 0.86 | 1.09 | 1.06 | 1.23 | 1.32 |
| f2/f3 | −0.86 | −0.91 | −0.99 | −0.91 | −0.93 | −0.88 | −0.99 |
| f/f1 | 0.66 | 0.71 | 0.85 | 0.72 | 0.73 | 0.68 | 0.70 |
| CT5/(CT6 + CT7) | 0.29 | 0.39 | 0.51 | 0.42 | 0.43 | 0.32 | 0.26 |
| CT1/CT2 | 1.04 | 0.99 | 1.09 | 1.04 | 1.03 | 1.03 | 0.99 |
| T67/CT7 | 0.52 | 0.46 | 0.29 | 0.31 | 0.31 | 0.38 | 0.51 |
| DT11/DT33 | 1.09 | 1.19 | 1.23 | 1.13 | 1.09 | 1.09 | 1.09 |
| f/R14 | 3.03 | 3.00 | 2.91 | 3.11 | 3.10 | 3.13 | 3.12 |

The present disclosure also provides a camera device, and its photosensitive element may be a photosensitive charge-coupled device (CCD) or a complementary metal-oxide semiconductor element (CMOS). The camera device may be an independent camera device such as a digital camera or a camera module integrated on a mobile electronic device such as a cell phone. This camera device is equipped with the above-described camera lens assembly.

The above description is only the preferred embodiments of the present disclosure and illustrative of the application of the technical principles. It should be understood by those skilled in the art that the scope of the invention involved in the present disclosure is not limited to the technical solution formed by the particular combinations of the above technical features, and should also cover other technical solutions formed by any combinations of the above technical features or its equivalent features without departing from the inventive conception. For example, a technical solution formed by replacing the above features with the technical features disclosed in the present disclosure (but not limited to) having similar functions.

What is claimed is:

1. A camera lens assembly, having a total effective focal length f and an entrance pupil diameter EPD, the camera lens assembly comprising sequentially, along an optical axis from an object side to an image side, a first lens, a second lens, a third lens, a fourth lens, a fifth lens, a sixth lens and a seventh lens, wherein, the first lens has a positive refractive power, and an object side surface of the first lens is a convex surface;

the second lens has a positive refractive power, and an object side surface and an image side surface of the second lens are convex surfaces;

the third lens has a negative refractive power;

the fourth lens and the fifth lens have a positive refractive power or a negative refractive power;

the sixth lens has a positive refractive power or a negative refractive power, and an image side surface of the sixth lens is a concave surface in a paraxial region; and the seventh lens has a negative refractive power, an image side surface of the seventh lens is a concave surface in the paraxial region, wherein the total effective focal length f and the entrance pupil diameter EPD satisfy: f/EPD≤1.9, wherein the camera lens assembly has and only has seven lenses having refractive power, and wherein the total effective focal length f and a radius of curvature of the image side surface of the seventh lens R14 satisfy: 2.5<f/R14<4.0.

2. The camera lens assembly according to claim 1, wherein the seventh lens has at least one inflection point.

3. The camera lens assembly according to claim 1, wherein a distance from the object side surface of the first lens to an image plane of the camera lens assembly on the optical axis TTL and half a diagonal length of an effective pixel area on the image plane of the camera lens assembly ImgH satisfy: TTL/ImgH≤1.7.

4. The camera lens assembly according to claim 1, wherein an effective focal length of the first lens f1 and an effective focal length of the second lens f2 satisfy: 0.5<f1/f2<1.5.

5. The camera lens assembly according to claim 1, wherein an effective focal length of the second lens f2 and an effective focal length of the third lens f3 satisfy: −2<f2/f3<0.

6. The camera lens assembly according to claim 1, wherein the total effective focal length f and an effective focal length of the first lens f1 satisfy: f/f1≤0.9.

7. The camera lens assembly according to claim 1, wherein a center thickness of the fifth lens CT5, a center thickness of the sixth lens CT6, and a center thickness of the seventh lens CT7 satisfy: 0.1<CT5/(CT6+CT7)<0.8.

8. The camera lens assembly according to claim 1, wherein a center thickness of the first lens CT1 and a center thickness of the second lens CT2 satisfy: 0.6<CT1/CT2<1.5.

9. The camera lens assembly according to claim 1, wherein an air spacing between the sixth lens and the seventh lens on the optical axis T67 and a center thickness of the seventh lens CT7 satisfy: 0.2<T67/CT7<1.

10. The camera lens assembly according to claim 1, wherein a maximum effective radius of the object side surface of the first lens DT11 and a maximum effective radius of an image side surface of the third lens DT33 satisfy: 0.8<DT11/DT33<1.5.

11. A camera lens assembly comprising sequentially, along an optical axis from an object side to an image side, a first lens, a second lens, a third lens, a fourth lens, a fifth lens, a sixth lens and a seventh lens, wherein an image side surface of the second lens is a convex surface, the sixth lens has a positive refractive power or a negative refractive power, and an image side surface of the sixth lens is a concave surface in a paraxial region; and the seventh lens has a negative refractive power, and an image side surface of the sixth lens is a concave surface in the paraxial region, and an air spacing between the sixth lens and the seventh lens on the optical axis T67 and a center thickness of the seventh lens CT7 satisfy: 0.2<T67/CT7<1, and wherein the camera lens assembly has and only has seven lenses having refractive power.

12. The camera lens assembly according to claim 11, wherein the first lens has a positive refractive power, and an object side surface of the first lens is a convex surface;

the second lens has a positive refractive power, and an object side surface of the second lens is a convex surface;

the third lens has a negative refractive power; and the fourth lens and the fifth lens have a positive refractive power or a negative refractive power.

13. The camera lens assembly according to claim 12, wherein an effective focal length of the first lens f1 and an effective focal length of the second lens f2 satisfy: 0.5<f1/f2<1.5.

14. The camera lens assembly according to claim 12, wherein an effective focal length of the second lens f2 and an effective focal length of the third lens f3 satisfy: −2<f2/f3<0.

15. The camera lens assembly according to claim 12, wherein a center thickness of the first lens CT1 and a center thickness of the second lens CT2 satisfy: 0.6<CT1/CT2<1.5.

16. The camera lens assembly according to claim 12, wherein a maximum effective radius of the object side surface of the first lens DT11 and a maximum effective radius of an image side surface of the third lens DT33 satisfy: 0.8<DT11/DT33<1.5.

17. The camera lens assembly according to claim 12, wherein a center thickness of the fifth lens CT5, a center thickness of the sixth lens CT6, and a center thickness of the seventh lens CT7 satisfy: 0.1<CT5/(CT6+CT7)<0.8.

18. The camera lens assembly according to claim 12, wherein an air spacing between the sixth lens and the seventh lens on the optical axis T67 and a center thickness of the seventh lens CT7 satisfy: 0.2<T67/CT7<1.

19. The camera lens assembly according to claim 13, the camera lens assembly having a total effective focal length f and an entrance pupil diameter EPD, wherein the total effective focal length f and the entrance pupil diameter EPD satisfy: f/EPD≤1.9.

* * * * *